(12) United States Patent
Zhao et al.

(10) Patent No.: US 12,494,227 B2
(45) Date of Patent: Dec. 9, 2025

(54) NANOSTRUCTURING FROM OPTICAL RECORDING MEDIA

(71) Applicant: The Board of Regents of the Nevada System of Higher Education on Behalf of the University of Nevada, Las Vegas, Las Vegas, NV (US)

(72) Inventors: Hui Zhao, Las Vegas, NV (US); Shengjie Zhai, Las Vegas, NV (US); Yihong Zhao, Las Vegas, NV (US)

(73) Assignee: The Board of Regents of the Nevada System of Higher Education on Behalf of the University of Nevada, Las Vegas, Las Vegas, NV (US)

( * ) Notice: Subject to any disclaimer, the term of this patent is extended or adjusted under 35 U.S.C. 154(b) by 0 days.

(21) Appl. No.: 18/803,360

(22) Filed: Aug. 13, 2024

(65) Prior Publication Data
US 2025/0299696 A1    Sep. 25, 2025

Related U.S. Application Data

(60) Provisional application No. 63/567,333, filed on Mar. 19, 2024.

(51) Int. Cl.
*G11B 7/24091* (2013.01)
*G11B 7/00* (2006.01)
*G11B 7/24085* (2013.01)
*G11B 7/253* (2013.01)
*G11B 7/26* (2006.01)

(52) U.S. Cl.
CPC ...... *G11B 7/24091* (2013.01); *G11B 7/24085* (2013.01); *G11B 7/253* (2013.01); *G11B 7/263* (2013.01); *G11B 2007/0006* (2013.01); *G11B 2007/25304* (2013.01)

(58) Field of Classification Search
CPC . G11B 7/24091; G11B 7/24085; G11B 7/253; G11B 7/263; G11B 2007/0006; G11B 2007/25304
See application file for complete search history.

(56) References Cited

U.S. PATENT DOCUMENTS

| | | | |
|---|---|---|---|
| 9,786,845 B1 | 10/2017 | Smith et al. | |
| 10,134,989 B2 * | 11/2018 | Smith | H10F 77/703 |
| 2007/0212522 A1 * | 9/2007 | Heidari | B82Y 10/00 |
| | | | 428/141 |
| 2008/0115156 A1 * | 5/2008 | Fetouhi | G11B 23/0028 |

* cited by examiner

*Primary Examiner* — Andrew Sasinowski
(74) *Attorney, Agent, or Firm* — Ballard Spahr LLP

(57) ABSTRACT

Devices having at least one nanostructured layer derived from a binary sequence written onto an optical medium and methods of preparing the nanostructured layers.

20 Claims, 23 Drawing Sheets

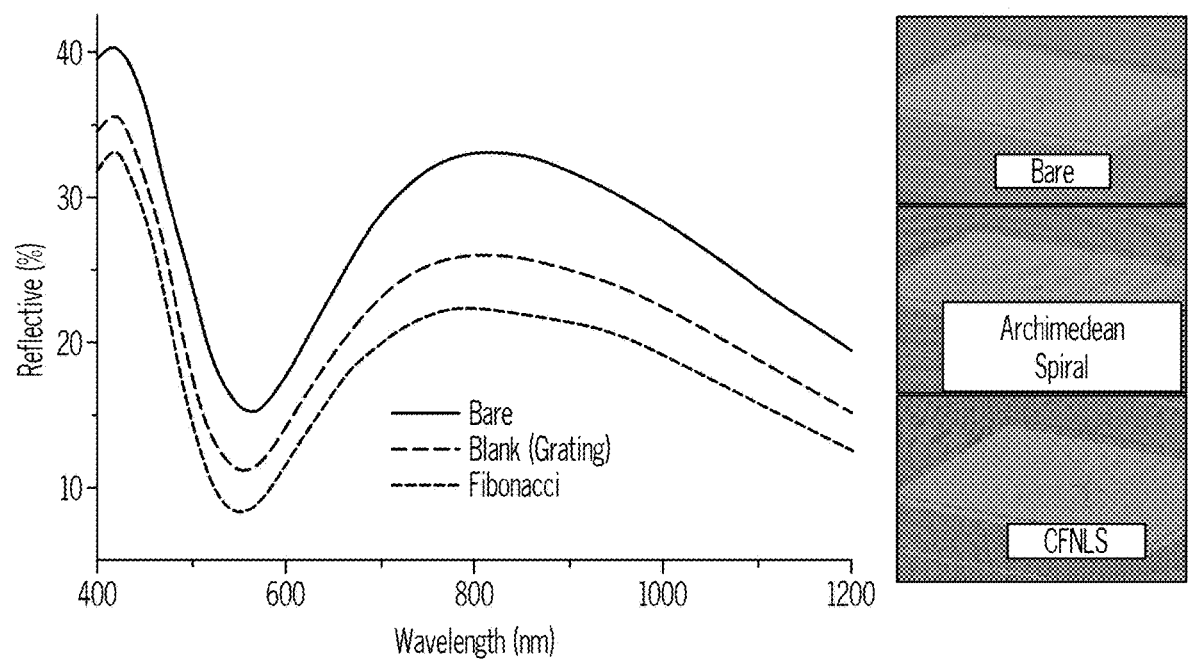
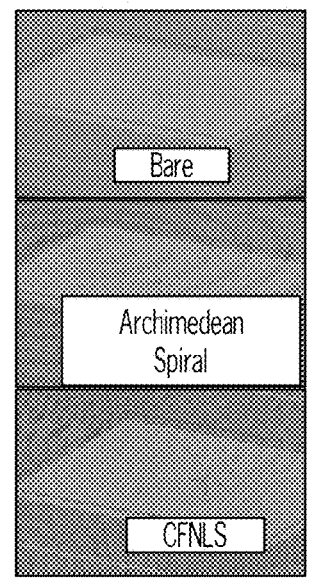
FIG. 4A
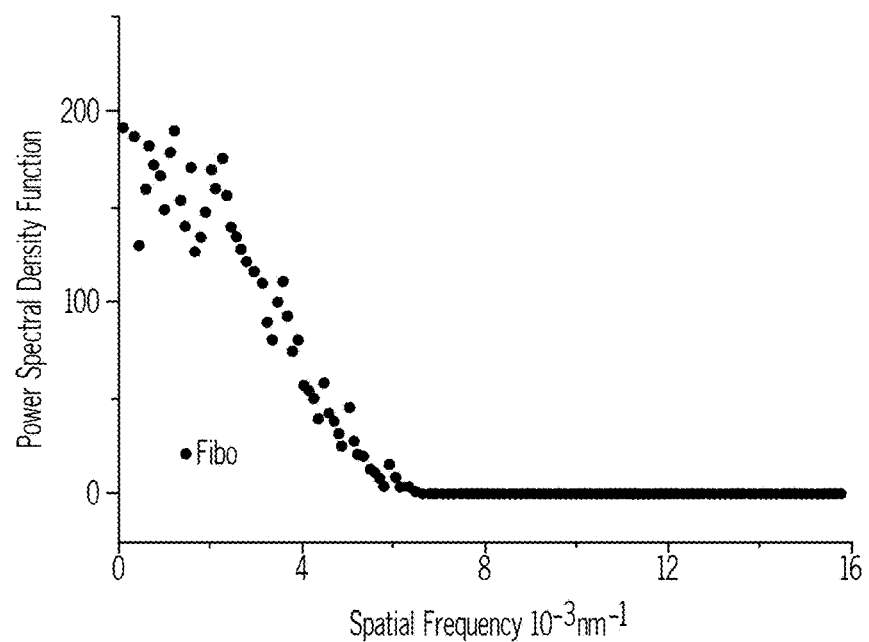
FIG. 4B

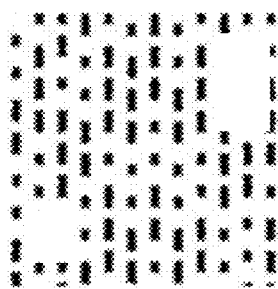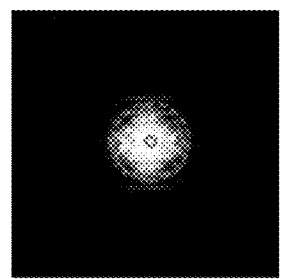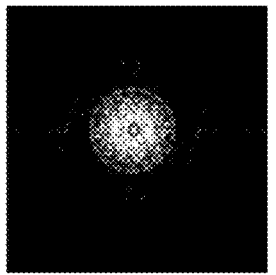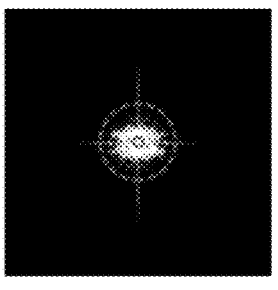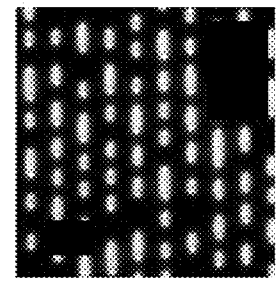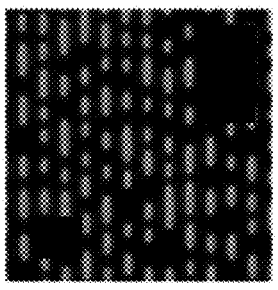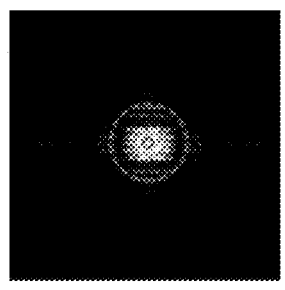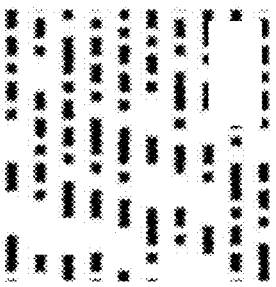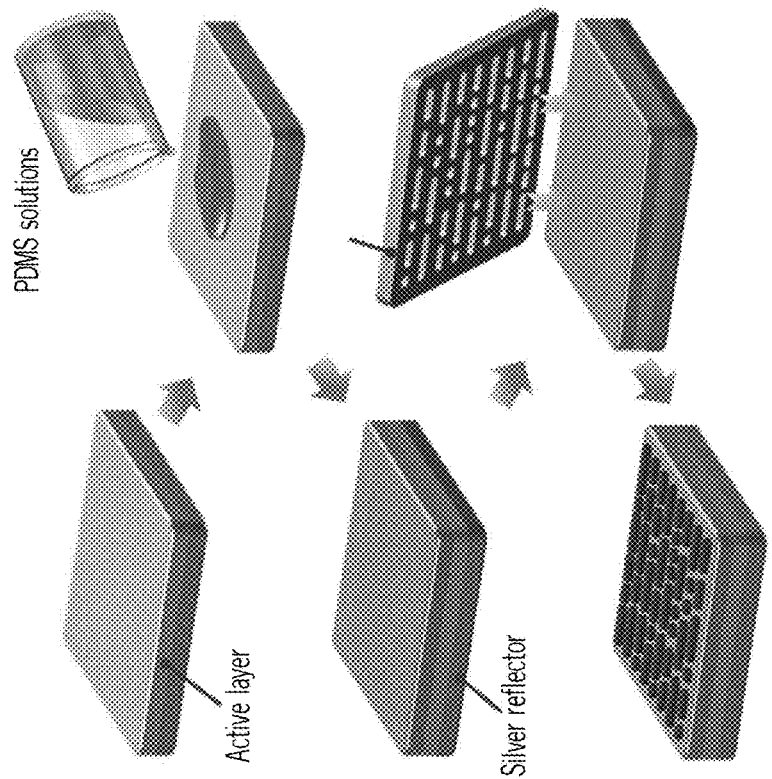

NANOSTRUCTURING FROM OPTICAL RECORDING MEDIA

CROSS-REFERENCE TO RELATED APPLICATIONS

This application claims priority to U.S. Provisional Application No. 63/567,333, filed Mar. 19, 2024, which is incorporated into this application by reference.

BACKGROUND

Many modern devices utilize micro- and nano-scale features to enhance a variety of performance characteristics, examples being the use of such a structure to reduce light reflection from the surface of a solar panel or to increase contrast on the screen of a mobile device. Such structures are frequently used in optoelectronic devices, optical devices, photonics devices, laser-based nano-processors, chemical and physical sensors, surface-enhanced Raman spectroscopy devices, drug delivery devices, and other related applications. Known methods of preparing micro- and nano-scale features in modern devices include photolithography, electron beam methods, among many others. These methods suffer from a variety of drawbacks, and improved microstructuring and nanostructuring methods are needed.

SUMMARY

The disclosed method of nanostructuring a layer of a device generally comprises writing a pattern of nanostructures onto an optical medium, the pattern of nanostructures having a plurality of tracks aligned along their longitudinal axes, each of the plurality of tracks having a plurality of nanostructures, wherein the pattern of nanostructures is derived from a binary sequence; and imprinting at least a portion of the pattern of nanostructures or a negative replica thereof on a surface of the layer of the device. Devices prepared from the method are also described.

The disclosed device generally has at least one layer which has a surface having a pattern of nanostructures imprinted thereon, the pattern of nanostructures having a plurality of tracks aligned along their longitudinal axes, each of the plurality of tracks having a plurality of nanostructures, wherein the pattern of nanostructures is derived from a binary sequence.

BRIEF DESCRIPTION OF THE DRAWINGS

The foregoing summary, as well as the following description of the disclosure, is better understood when read in conjunction with the appended drawings. For the purpose of illustrating the disclosure, the drawings illustrate some, but not all, alternative embodiments. This disclosure is not limited to the precise arrangements and instrumentalities shown. The following figures, which are incorporated into and constitute part of the specification, assist in explaining the principles of the disclosure.

FIG. 4A shows simulated reflectance of a thin-film solar cell with and without the light-trapping structure and ASA only as a comparison.

FIG. 4B shows spatial frequency related power spectral density of the 2D Fibo quasi-random nanostructures.

FIG. 11B—Thue-Morse; FIG. 11C—Rudin-Shapiro.

FIG. 12B—Thue-Morse sequence; FIG. 12C—Rudin-Shapiro sequence; FIG. 12D—Halton (2,3) sequence.

FIG. 13A shows schematics of thin-film CIGS fabrication and final device configuration.

FIGS. 13B-13E show SEM and simulated images of the Fibo quasi-random nanostructures and their Fourier Transform Analysis;

FIGS. 13F-13I show SEM and simulated images of the RS quasi-random nanostructures and their Fourier Transform Analysis.

FIG. 16 shows optimization of quasi-random nanostructure star discrepancy and reflectance for broadband light-trapping.

DETAILED DESCRIPTION

Figure 1B:
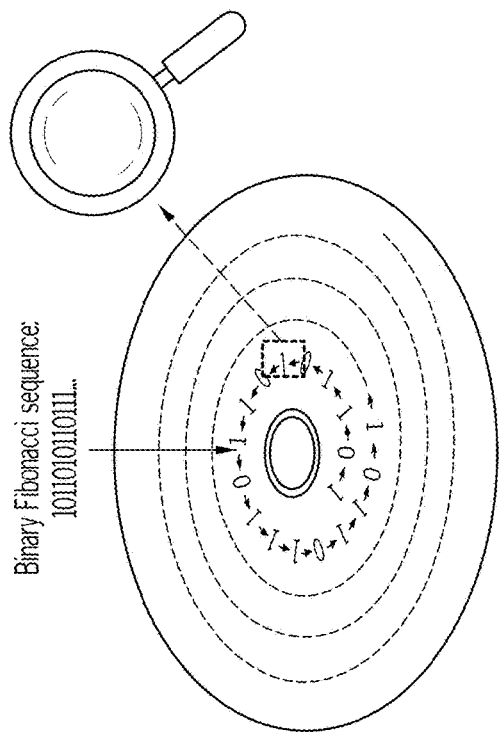
FIG. 1B shows the schematic of a binary Fibonacci sequence mapped into a writable disc.
Figure 1D:
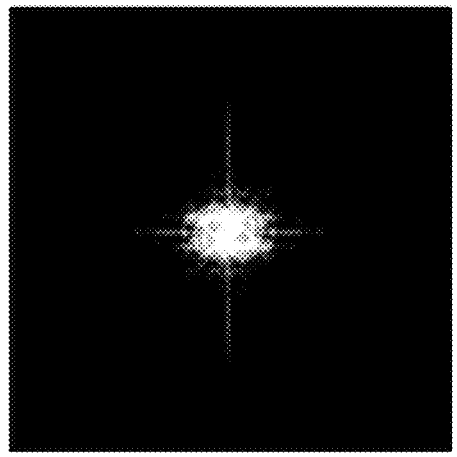
FIG. 1D shows the Fourier Transform based on the SEM image of the Fib quasi-random nanostructure.
Figure 1A:
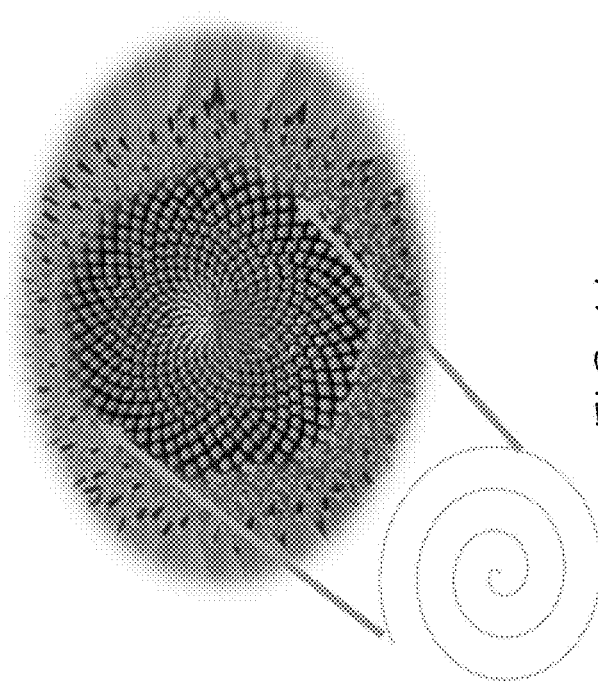
FIG. 1A shows a spiral curve in a sunflower.
Figure 1C:
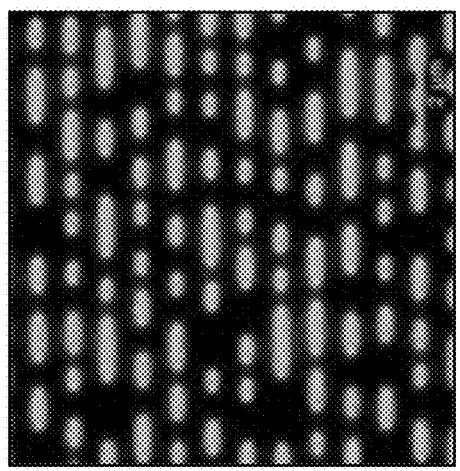
FIG. 1C shows the SEM image of the Fib quasi-random nanostructure inside an optical disc.

The disclosed method of nanostructuring comprises using an optical medium as a template by writing a pattern of nanostructures onto the optical medium such that the pattern can be directly or indirectly transferred to a layer of a device. Representative devices include optoelectronic devices, optical devices, photonics devices, laser-based nano-processors, chemical and physical sensors, surface-enhanced Raman spectroscopy devices, and drug delivery devices, among others. In some embodiments, a surface of the layer of the device to be patterned comprises nanostructured polydimethylsiloxane (PDMS). One non-limiting example of a layer suitable for nanostructuring according to the disclosed method is one or more anti-reflective layers in an optical device, such as a solar cell. Molds can also be created using the described nanostructuring method.

Contemplated nanostructures include structures that may be considered microscale in some aspects. In some embodiments, a "nanostructure" can be any structure having at least one dimension that is 1,000 nm or less. In one embodiment, the plurality of nanostructures is a plurality of a combination of at least two of pits, lands, pyramids, tubes, pillars, among other nanostructures. In a further embodiment, the plurality of nanostructures is a plurality of pits and lands.

In general, the sizes of the nanostructures may depend on the optical medium. For example with optical discs such as CDs, DVDs, and Blu-Ray discs, track pitches, pit lengths, and pit widths will influence the size of pits and lands formed after writing the pattern of nanostructures onto the medium (see Table 1 below). A variety of optical media can be used including commercially available forms that typically include a recording layer on a polycarbonate substrate. Other suitable materials having optical media can include a dye (Cyanine Dye, Phthalocyanine Dye, and Azo Dye), a phase-change recording layer (AgInSbTe, GeSbTe), an Inorganic recording layer (CuSiInAg, TiO2-SiO2, ZnS—SiO2, and a stone-like material). An inversed recording layer can be fabricated by an imprinting method including: a polycarbonate recording layer, a poly(methyl methacrylate) (PMMA) recording layer, a polyimide (PI) recording layer, a polyethersulfone (PES) recording layer, a polysulfone (PSU) recording layer, or any combination of these recording layers. In one embodiment, the pattern of nanostructures has a plurality of tracks aligned along their longitudinal axes, each of the plurality of tracks having a plurality of nanostructures.

The pattern of nanostructures can be derived from a binary sequence. The binary sequence can be one-dimensional or two-dimensional and can be based on any binary sequence, including for example a quasi-random pattern. Non-limiting examples include a Fibonacci sequence, a Thue-Morse sequence, a Rudin-Shapiro sequence, or a Halton sequence (which is a two-dimensional sequence). Nanostructures can also be derived from a periodic or random sequence to in turn create periodic or random structures. In one embodiment, the pattern of nanostructures has a surface randomness derived from at least one star discrepancy calculation.

Imprinting the pattern of nanostructures onto a layer of a device can be accomplished in a variety of ways. For instance, the optical medium itself can be used as a stamp for the device layer or in other aspects a negative replica mold or master utilizing written optical medium can be used. In one aspect, imprinting comprises preparing a negative replica mold of the pattern of nanostructures and stamping the surface of the layer of the device with the negative replica mold. In another aspect, imprinting comprises stamping the surface of the layer of the device with the optical medium itself or a portion thereof (such as the recording layer or a portion thereof) having the pattern of nanostructures written thereon. Stamping can be accomplished through methods such as hot-embossing in which the stamp or mold is removed once the surface of the device layer is patterned. In one aspect, the described method can be scaled up as desired using methods such as the glass-mastering method, which is known in the art. Other methods include laser-scribing, laser engraving, e-beam lithography, and ion-beam lithography.

Three-dimensional and varied two-dimensional nanostructured layers can also be fabricated. In one aspect, the method comprises imprinting at least one additional overlying pattern of nanostructures on the surface of the layer of the device, wherein the at least one additional overlying pattern of nanostructures has a plurality of tracks aligned along their longitudinal axes, each of the plurality of tracks having a plurality of nanostructures, and wherein the overlying pattern of nanostructures is derived from the same binary sequence or a different sequence (as needed). In one aspect, an angle θ defined by the longitudinal axes of the tracks of the at least one additional overlying pattern of nanostructures relative to the longitudinal axes of the tracks of the first pattern of nanostructures is different and within the range of $0°<\theta<360°$.

In one aspect, once the nanostructured layer has been formed on a surface of a device, the nanostructured layer can be doped with titanium oxide. A doped layer of titanium oxide can provide for a number of advantages. Doping titanium dioxide can improve the optical performance of thin films, such as increasing transmittance and reducing reflectance, thereby enhancing the anti-reflection film's effectiveness. Doped titanium dioxide thin films have more uniform optical properties, reducing reflection and scattering in optical devices. In addition, doping titanium dioxide can improve the mechanical properties of thin films, such as hardness and wear resistance, and enhance the durability and stability of anti-reflection films and extend their lifespan. It also provides for wide applications in environmental protection. Similarly, doping titanium dioxide can enhance the chemical stability of thin films, making them more resistant to acid and alkali corrosion, which is beneficial for maintaining performance stability in harsh environments.

Due to their small size, nanometer-sized $TiO_2$ particles are typically much smaller than the wavelength of visible light, which primarily results in Rayleigh scattering. This scattering is relatively weak, allowing the coating to maintain its transparency. When the particle size approaches or exceeds the wavelength of incident light, Mie scattering becomes dominant, leading to more pronounced light scattering, which can reduce transparency and affect optical performance. Moreover, due to $TiO_2$'s high refractive index in both visible and ultraviolet regions, effective anti-reflective effects can be achieved across a broadband spectral range, thereby enhancing the solar cell's absorption of light across multiple wavelengths.

The described method and nanostructured devices have a number of applications. Some examples include any anti-reflective application. These include wind-shields, heads-up-displays, and mobile device applications. The resulting devices can have anti-reflective properties which significantly increase light trapping and reduce surface reflection (large angle) that can aid for instance in reducing ghost images (double-reflections) and provide for crisp viewing of content such as that appearing on a heads-up-display.

The described method and nanostructured devices are notably different from methods involving pre-written CDs, DVDs, and Blu-rays, which include high-entropy binary sequences for content. To record digital information in an optical disc such as CD/DVD/Blu-ray, compression algorithms convert data into a high-entropy binary sequence per bit. An error-correcting and modulation code is imposed to the sequence so that the total number of each continuous zeros and ones lies between 2 and 7, since very short zeros and ones give rise to small signal amplitudes and very long zeros and ones are hard to distinguish from noise due to scratches or fingerprints. Due to this error-control modulation in standard optical disc recording, no matter what the recorded content or area selected is, burned optical discs all have similar Fourier components over a broad spectrum. Therefore, with a pre-written disc, such as a Blu-ray movie disc it is not possible to increase the efficiency of resulting thin-film solar cells due to the error-correction coding inherent with optical disc standards. Thus, it is impossible to design an arbitrary binary sequence unlike the disclosed approach.

The disclosed sequences exploit pits and lands as the building blocks to create on-demand quasi-random nanostructures by directly burning raw data. The described customized algorithm was developed in a way bypass standard error-control modulation, self-checkup, and calibration. To write the designed binary sequence, input data was created without a sub-header, error correction, and error detection. In this way, the raw data consisting of 1s and 0s can be burned to the digital optical disc by direct one-to-one mapping.

Pre-written discs encode data into binary format (1s and 0s) through a plurality of pits, lands, which are read by a laser in the optical drive. However, the resulting internal nanostructures are predetermined by the manufacturing process and are not optimized for any specific optical properties beyond data storage. In contrast, writable optical discs offer a way to tailor these nanostructures using binary data (ISO files) converted by binary sequences, allowing for deliberate design and control. For instance, periodic nanostructures can be created by arranging binary data in regular, repeating patterns, which are useful for applications like diffraction gratings, photonic crystals, or other devices that rely on regularity. Random nanostructures can be generated using random binary sequences, which may be advantageous in applications requiring diffuse scattering, such as certain sensors or anti-reflective coatings. In these cases, methods like dice rolling, coin flipping, or the random positioning of objects like blown leaves are often employed. Quasi-random nanostructures can be designed by arranging quasi-random sequences and converting them into binary data. By carefully selecting the sequences used to encode data, specific nanostructures can be "written" directly onto the disc's surface, tailoring its optical properties for advanced applications.

Current commercial optical discs are primarily designed for data storage, with the data format determined by the type of files being stored, such as movies, games, or music. In this context, the nanostructures within pre-made discs are not controllable. To gain control over the nanostructures representing binary data (1s and 0s), sequences can be used to guide the design of various nanostructures, including periodic, random, and quasi-random patterns. In addition to designs like periodic nanostructures (blank discs with grating tracks or patterns of periodic 1s and 0s) and random nanostructures (using random sequence generators), the disclosed approach allows for the realization of complex quasi-random nanostructures using quasi-random sequences (such as Rudin-Shapiro or Halton sequences). Unique advantages of quasi-random nanostructures, such as their richer Fourier spectra, have led to improvements in broadband optical performance.

There are still recognized challenges in optimizing quasi-random nanostructures (QRNs) for superior broadband light trapping properties. Specifically, traditional QRN designs face several issues: (i) Topology Optimization: This approach is hindered by the complexity of defining thousands or millions of design variables, creating obstacles in large-scale design modifications; (ii) Descriptor-Based Methods: While these methods use efficient parametric concepts such as filling ratio and feature size to simplify design, controlling and optimizing key descriptors often require extensive data analysis, including machine learning and deep learning techniques; and (iii) Correlation Functions: Using correlation functions for QRN design can increase fabrication costs. The disclosed approach uses sequences represented by binary data to address these challenges. This method allows for precise control of functions and variables. Additionally, the low cost and rapid fabrication methods provided by optical disc laser writing technology ensures a direct mapping between designed patterns and nanomanufacturing conditions.

EXAMPLES

The following examples further illustrate this disclosure. The scope of the disclosure and claims is not limited by the scope of the following examples.

I. Light-Trapping Nanostructure for Solar Cell

Thin-film solar cells are one of the important candidates for reducing the cost of photovoltaic production with less use of active materials. However, thin-film solar cells' low light absorption stifles development when the photons have to be absorbed within a layer as thin as a few hundred micrometers (or less). An effective light-trapping structure or coating can address this optical challenge to maximize the solar cell's power conversion efficiency (PCE). One challenge with mimicking nanostructures for such purposes from nature for instance is reliance on expensive and time-consuming top-down nanomanufacturing such as e-beam lithography or focused-ion beam lithography. The Archimedean spiral is one example of such a nanostructure found in nature, e.g., in the sunflower.

The Archimedean spiral can be found on data storage media, such as CDS, DVDS, and Blu-rays. In such media, binary data with values "1s" and "1s" start from the innermost track and are burned in an outward direction in a spiral arrangement. Optical disc technology provides advantages of low-cost and high throughput to directly fabricate pits and lands in nanostructure form determined by binary data (i.e., 1s and 0s) along the spiral track (FIG. 1). To mimic the sunflower pattern, the binary Fibonacci (Fibo) sequence was imported as binary data to represent the relationship between pits and lands. The Fibonacci sequence of numbers forms the best whole number approximation to the Golden Ratio, which is also found in sunflowers. This kind of structure offers an optimal volume fraction and filling ratio to capture light.

The Fibonacci pattern is the paradigm of deterministic quasi-periodic order that can be obtained by combining two different building blocks. The Fibonacci structure shows distinct diffractions that cannot be found in either periodic or random structures. The Fourier spectra of Fibonacci structures have isolated Bragg peaks with incommensurate periods, which appear to continuously fill into the reciprocal space, a typical feature of the quasi-random structure. These spectral features lead to physical properties exhibited by Fibonacci patterns. They have been used to induce symmetry resonance, enhance the nonlinear coupling, and suppress the group velocity at the band edge states. To fabricate Fibonacci patterns, the land can be represented as blank and the pit as building blocks, respectively. According to the concatenation rule, $$S_j = S_{j-1} S_{j-2}$$

The first six generations of the sequence will be:
1→11→1110→11101101→1110110111100010

The sequence can be continuous. The quasi-random structures are mesoscale periodic. Thus, this fabrication method can create the mesoscale periodicity by selecting a generation of the sequence as the element for repeating.

After confirming the 1D binary Fibo sequence, the entire binary sequence is further converted into a 2D binary matrix in a specific arrangement. A spiral arrangement is used to arrange the 1D binary sequences into the 2D binary matrix, which is the Archimedean spiral arrangement inspired by the sunflower. This kind of 2D binary matrix can contribute to optimizing light capture because the structure arrangement correlation at the macroscopic level has a significant impact on the optical performance of nanostructures. The binary sequences with values "1s" and "0s" are arranged from the innermost track in the outward direction along the spiral track. This spiral arrangement can be realized by using optical disc technology. The total length L of the track can be calculated by the following equation:

$$L = (2\pi R) \cdot VT$$

where the R is the radii of the track, V is the velocity of the writing speed or conversion speed, and T is time. Due to the infinite nature of binary sequences, the pattern can be infinitely extended by spiraling. Therefore, the continuous nature of such an array allows tailoring of integrated nanostructures to specific sizes at the surface (i.e., x-y plane) for different applications. Considering a nanostructured solar cell as an example, if the design requires a 200 W output solar device, and if each square inch provides 50 W, then $\pi R^2 = 4$ square inches is enough to generate the output power. With this example in mind, the total length L of the track is calculated based on these parameters, and the length of the binary sequence can be determined and extended without interrupting the property of the nanostructures. The method offers precise control of the size of nanostructures so that they can be modified and extended as desired. Finally, each binary element (i.e., 1 or 0) in the binary matrix is represented in the 2D geometry by a unit square (1s→pits, 0s→lands).

Figure 2A:
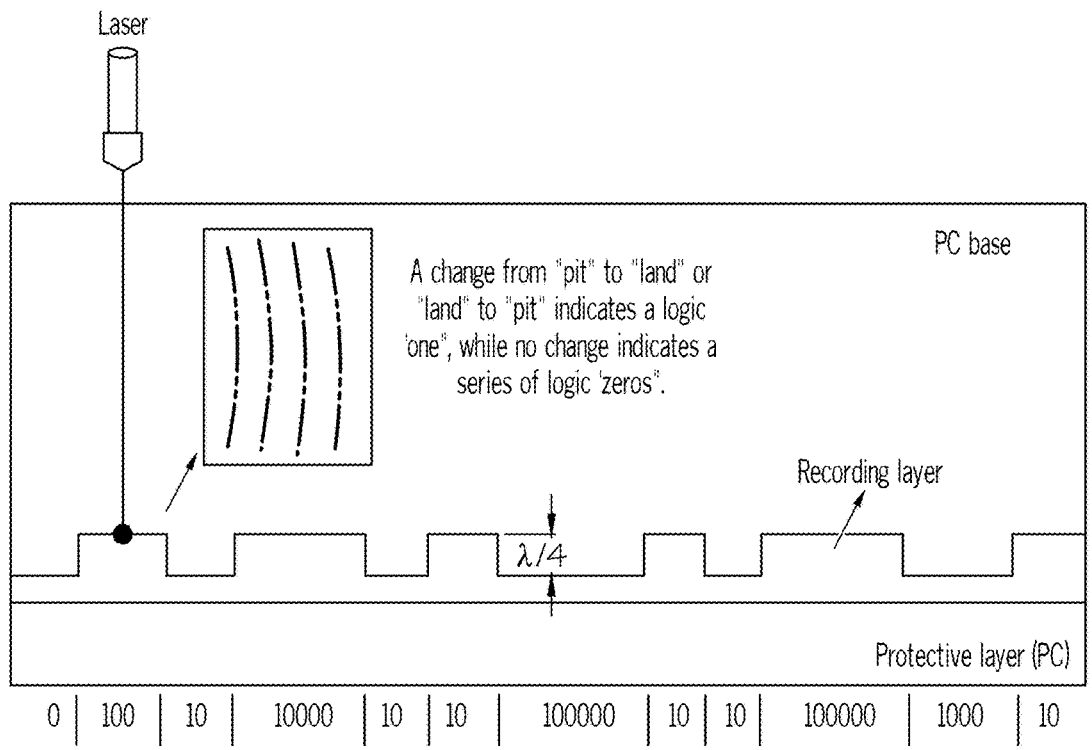
FIG. 2A shows the layered structure of an optical disc.
Figure 2B:
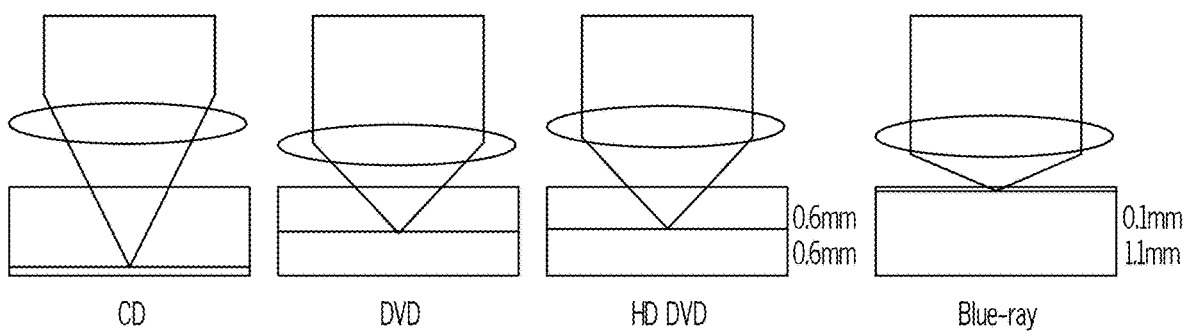
FIG. 2B shows schematics of the optical disc structure with different lasers for different optical discs (CD, DVD, HD DVD, and Blu-ray).

An optical driver is used to transfer the 2D Fibo quasi-random nanostructure pattern to a real mold for future anti-reflective coating fabrication. During the writing process, the diode laser is directed by a polarizing beam splitter, which rotates the polarization plane of the laser beam. As a result, the light beam is collimated, creating a parallel beam. The parallel beam passes through an objective lens and is focused onto the data track in the disc to write the lands and pits based on the programmed digital information (FIG. 2). The laser beam scans the disc surface in a spiral pattern from the center to the outer as the optical disc rotates counter-clockwise.

Optical discs like CDs, DVDs, and Blu-rays were developed for high-density data storage. Following optic disc industry standards, the designed binary Fibonacci sequence was converted to precise nanoscale pits and lands 1:1 with lengths from 150 nm to 800 nm. The nanomanufacturing method makes use of the stamps derived from the optical media discs in order to nanoimprint the designed 2D patterns contained within the recording layer of the optical media discs onto anti-reflective coatings. The generated 2D quasi-random nanostructures are naturally distributed along the Archimedean spiral data tracks. Different optical media disc formats (e.g., CDs, DVDs, and Blu-rays) offer an efficient way to tune the quasi-random nanostructures to achieve the desired effects for different applications by adjusting the pit sizes of the quasi-random nanostructures, which covers nearly all wavelengths of the visible light as specified in Table 1.

TABLE 1

| Optical Storage Disc Formats | Track Pitch (nm) | Single Pit Length (nm) | Pit Width (nm) |
|---|---|---|---|
| CD | 1600 | 800 | 600 |
| DVD | 740 | 400 | 320 |
| BD(Blu-ray) | 320 | 150 | 130 |

DVD optical discs were used as the substrate for the nanopatterned molds. Coded DVDs were clipped from the middle and preheated in a water bath (Poly Science Company) at 50° C. for 30 mins. The DVDs were then dried by compressed air and trimmed at the edges. The protective layer (reflective layer) was gently peeled away. The molds were trimmed again and cleaned in deionized water by an ultrasonic cleaner for 480s. The DVD molds (i.e., the polycarbonate recording layer) were ready to use after drying.

Figure 3:
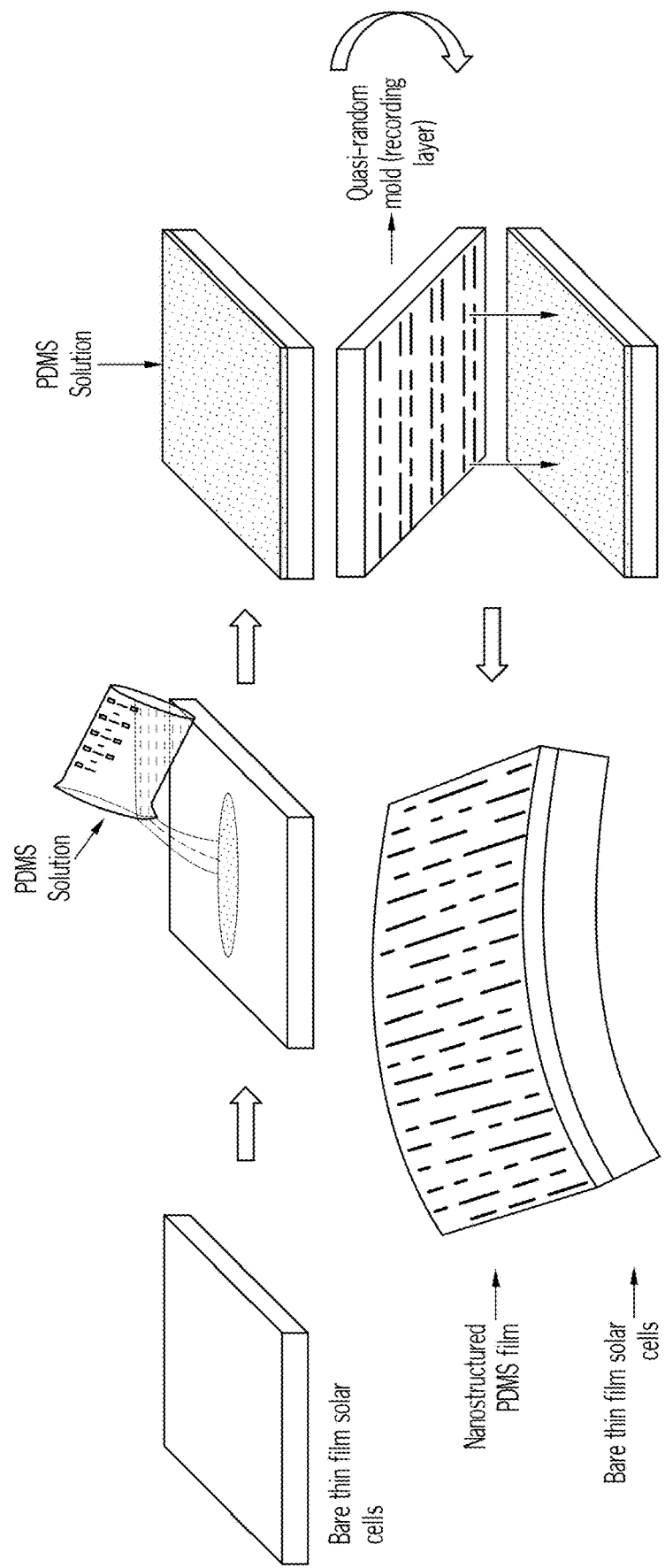
FIG. 3 shows a schematic of thin-film solar device fabrication with a light-trapping structure replicated from an optical disc mold.

Coatings were directly fabricated on thin-film solar cell devices using the nanoimprinting method, as shown in FIG. 3. It was found that 5 grams of SYLGARD 184 silicone elastomer curing agent and 50 grams of SYLGARD 184 silicone elastomer base (1:10 ratio) was sufficient to generate a 0.75 mm thick coating on the solar cell devices. The base and curing agent are thoroughly mixed for 5 minutes by hand stirring or using a magnetic stirrer. The mixed solution was placed into a vacuum chamber (Bel-Art vacuum chamber) and vacuum was applied (Gast Doap 704aa compressor vacuum pump 18 HP 115 Vac) for 30 mins. The pump was turned off, and the vacuum chamber valve was slowly pulled out to let the air in. By repeating this step, bubbles were removed from the solution.

The solar cell device was placed into a petri-dish and attached to it using Scotch tape, and the treated mixture was drop-cast over the device. The dish was put back into the vacuum chamber, and the pump was turned on again. Transfer pipettes were used to eliminate the trapped tiny bubbles in the solution. The dish was taken out and preheated in a Mini Incubator (Bio-Rad Company) for 10 mins at 80° C. A mold with the nanopatterned side facing down was laid onto the mixture. The dish was put back into the incubator and cured for at least 2 hours at 80° C. After two hours of incubating, the PDMS coating layer was cured. Tweezers are used to peel off the DVD mold and trim the edges of the device carefully. It is found that the M-disc DVDs can be more effective at inverting the different structures than standard DVDs due to their rock-like layers, which are more stable than the dye layers of standard DVDs.

The Fourier Transform Analysis (FTA) was performed on the generated structure images to demonstrate the improvement of the power spectral density related to spatial frequency (FIG. 4). The power spectral density illustrates that the light-trapping structure achieves a broader spectrum of energy compared to the bare and spiral only pattern. We numerically evaluated and verified the reflectance improvements by the commercial LUMERICAL FDTD software among bare thin-film solar cell, blank one, and the light-trapping one (FIG. 4). The results demonstrate the significant anti-reflection improvement at 550 nm, which is the region for light-to-electricity conversion in an a-Si:H thin-film solar cell.

Figure 5A:
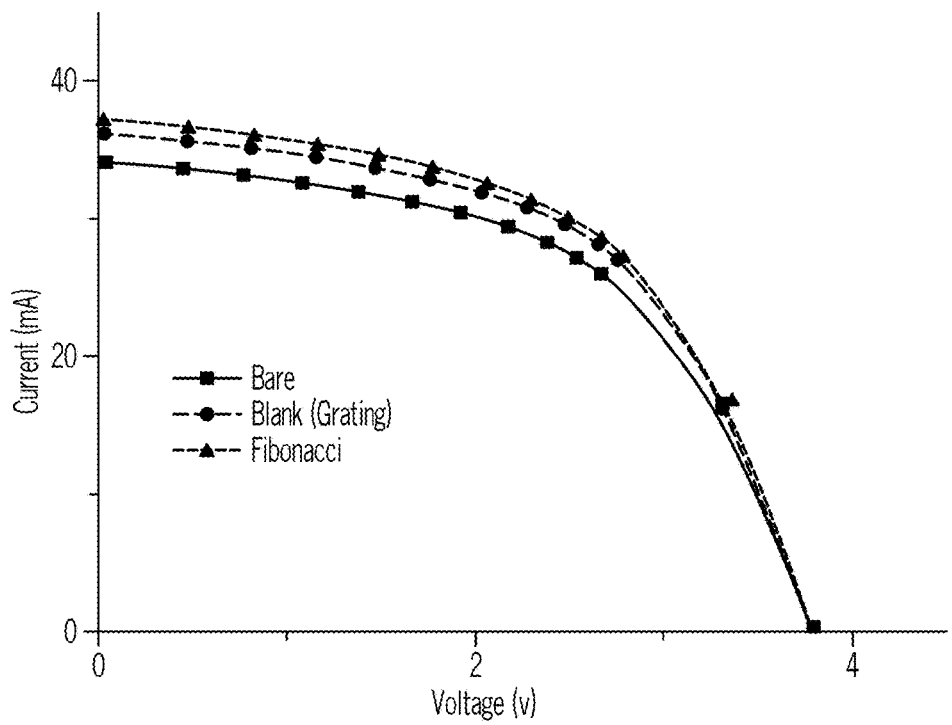
FIG. 5A shows the I-V curves of a thin-film solar cell with the light-trapping structure, and ASA only and without any coatings.
Figure 5B:
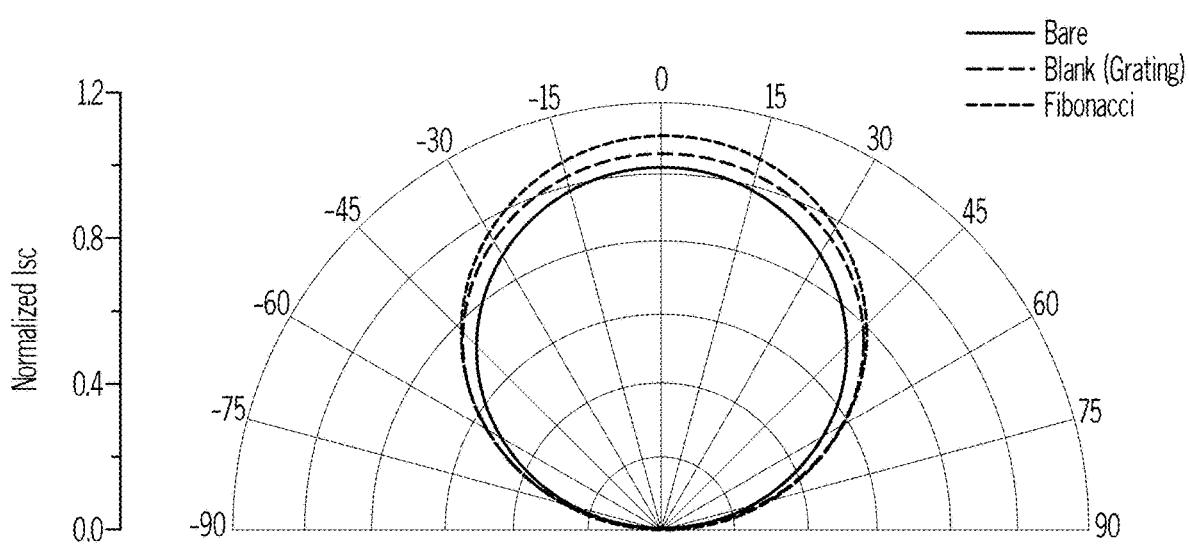
FIG. 5B shows the angular dependence of a normalized photocurrent with the light-trapping structure, ASA only, and without any coatings.
Figure 6A:
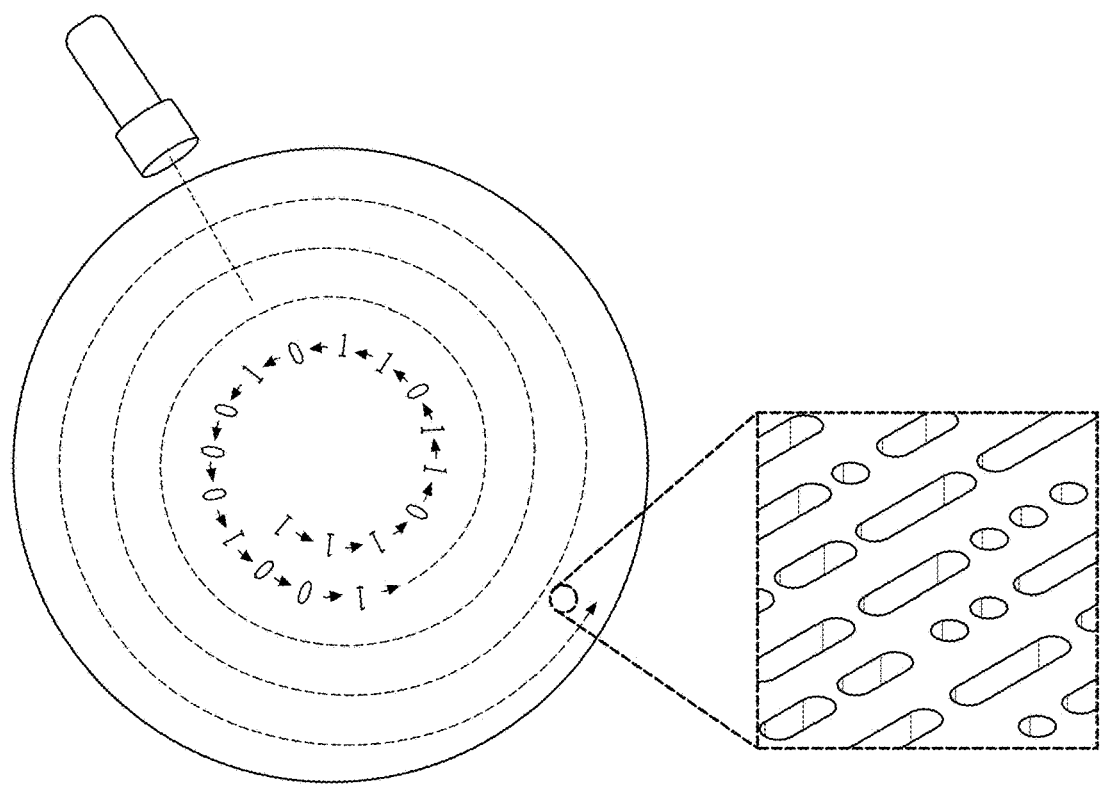
FIG. 6A shows the schematic of a writable disc and its recording layer.
Figure 6B:
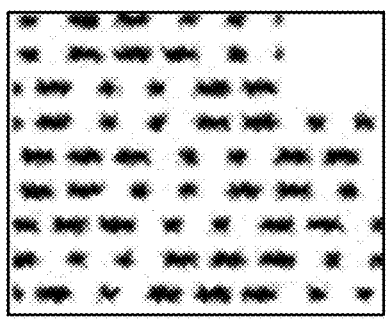
FIG. 6B shows a generated edge blurred quasi-random pattern design based on binary Rudin-Shapiro sequence with MATLAB.
Figure 6C:
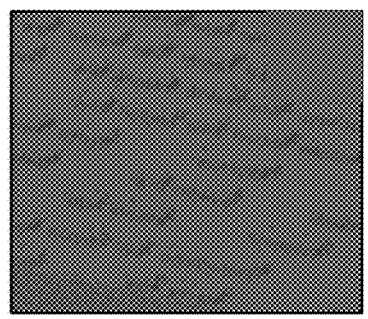
FIG. 6C shows a simulated quasi-random nanostructure image on Lumerical FDTD software.
Figure 6D:
FIG. 6D shows the SEM image of the fabricated quasi-random nanostructures derived from the optical recording layer.
Figure 6E:
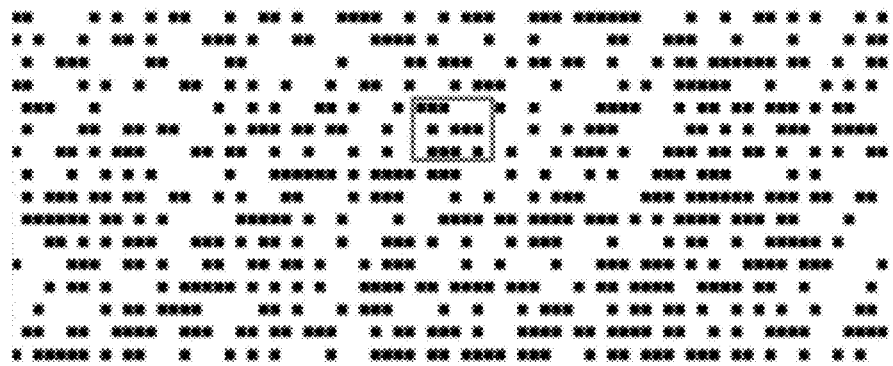
FIG. 6E shows an illustration of a 2D quasi-random pattern generated by binary Rudin-Shapiro sequence.

FIG. 5 illustrates the current-voltage characteristics measured under AM 1.5G illumination from a solar simulator for the coated solar cell. For the sake of comparison, the grating nanostructures derived from a blank disc (i.e., grating spiral track without burning any data) were also fabricated and tested. The grating nanostructures outperformed the bare Si-based thin-film solar cell due to the spiral arrangement, and the Fibo quasi-random nanostructures outperformed the grating structure due to their local randomness caused by pits and lands form. The result was a relative 8.62% short-circuit current improvement and a 8.31% power conversion efficiency enhancement compared to a bare solar cell. The difference in $I_{sc}$ arises from the superior antireflection performance by gradual refractive index change related to the local randomness change.

The angle of solar irradiation varies during a day. Therefore, the omnidirectional light-harvesting capability is important for a solar cell. According to Fresnel's law, the reflection often becomes more severe when the incident angle increases. Thus, it is useful to reduce the reflection loss at large incident angles to meet the demands of practical applications. According to the Lambert-Beer law, the relevant equation becomes: $\eta(\alpha)=1-\exp(-L)$, where $\eta(\alpha)$ is absorption efficiency and $\alpha$ is the wavelength-dependent absorption coefficient. A longer optical path length leads to more efficient light absorption. Scattered light will propagate into the device in the same direction as the incidence, which prolongs the optical path length. Under normal-direction light illumination, the optical path is related to the thickness of an active layer, which is $L=2n\cdot d$ (n is the refractive index of the active layer), while the scattered light leads to an optical path length of $L=2n\cdot d/\cos\theta$. For an increased $\theta$, the resulting L can be many times longer than that of the normal incidence.

The short-circuit current of an a-Si:H solar device with a grating anti-reflective coating and with or without the light-trapping structure was measured for different angles of the light incidence, varying from 0° to 75°. FIG. 5 shows that a larger photocurrent improvement of over 10% was observed in a wide incident-angle range of 0°~75°, suggesting an omnidirectional distribution of redirected incident lights. Benefiting from the Fibonacci pattern with the Archimedean spiral arrangement design, the light-trapping structure on the a-Si:H device can present a 11% higher photocurrent than that of the flat reference device at 30° incident light (30° from the perpendicular incident light). The omnidirectional improvement in the conversion efficiency is significant for the practical deployment of solar panels without a tracking system.

II. Discrepancy Assisted Quasi-Random Nanostructure Design

This examples describes an innovative closed-loop methodology for deterministic 2D quasi-random nanostructure design (FIG. 6), optimization, and scalable fabrication based on two concepts: digitalization and star discrepancy ($D^*_N$). A quasi-random pattern (QRP) is a 2D projection of quasi-random nanostructures since the heights of the quasi-random nanostructures are fixed to minimize structural complexity and ease fabrication. We first segment a 2D plane into a mesh matrix, where each element can be filled by either a "0" or a "1," corresponding to a unit-size land or pit in a 2D plane. The binary assignment of each element (i.e., "0" or "1") is derived from iteratively generated discrete quasi-random sequences (e.g., Thue-Morse (TM), Fibonacci (Fibo), Rudin-Shapiro (RS), etc.) and plots (e.g., Halton, etc.). By doing so, these generated binary matrices are directly converted into a deterministic 2D patterns over a mesh area with designed lands and pits. This one-to-one mapping process between patterns and matrices is the digitalization of a quasi-random pattern.

It has been reported that nanostructure spatial randomness (3D) is a factor for optoelectronic device light-trapping capability because nanostructures with a higher degree of spatial randomness are more likely to randomize, re-direct, and prolong the light path. For a quasi-random pattern, we focused on the surface randomness (2D) of the quasi-random nanostructures instead of the spatial randomness with the fixed nanostructure height. We introduced the star discrepancy ($D^*_N$) to describe the surface randomness of each 2D quasi-random pattern and run the corresponding finite-difference time-domain (FDTD) simulation and physical experiments to reveal the correlation between the quasi-random nanostructures' optical performance and their surface randomness (represented by $D^*_N$), i.e., the quasi-random nanostructure with a higher $D^*_N$ has a lower reflectance rate. Guided by this observation, we can therefore design a quasi-random pattern or optimize an existing quasi-random pattern to achieve a higher $D^*_N$ to further improve the optical performance of an optoelectronic device.

We fabricated anti-reflective coatings (ARCs) with well-designed quasi-random nanostructure patterns onto thin-film solar cells using optical disc technology, which employs stamps derived from the recording layer of a disc for nanoimprinting. The best anti-reflective coating with quasi-random nanostructures realized broadband light-trapping with >13.58% PCE enhancement over commercial solar cells, while its 46th optimized iteration pattern reduced an average 20% of the reflectance over a broad wavelength range. The optical simulations and physical experiments confirm the approach and demonstrate the superior optical performance of quasi-random nanostructures over periodic and random nanostructures in broadband and omnidirectional light-trapping capabilities. The proposed systematic quasi-random nanostructure design, optimization, and fabrication approach overcomes the aforementioned barriers with the following advantages, 1) the surface morphology of a quasi-random nanostructure directly depends on the generation of a binary matrix instead of complicated and indirect physical variables (e.g., volume fraction, material filling ratio, etc.); 2) suitable binary matrices can be selected and optimized by evaluating their $D^*_N$ values; 3) the generated binary matrices can be converted into physical pit/land nanostructure via optical disc technology.

The generation of the binary Fibonacci sequence is described above. Another quasi-random deterministic system whose Fourier spectra are continuous and constant is the Rudin-Shapiro structure (RS). The Rudin-Shapiro sequence is typically generated using a four-letter substitution rule to induce the new generation from the old one,

A→AB, B→AC, C→DB, D→DC beginning with the letter A (initial character), the first four generations are:

A→AB→ABAC→ABACABDB→ABACABDBA-BACDCAC . . .

By substituting each "A" and "B" with "1" and each "C" and "D" with "0", an RS sequence in four letter form is transformed to a binary sequence. By doing so, the substituted equation becomes:

1→11→1110→11101101→1110110111100010 . . . .

There are more complex deterministic quasi-random structures, possessing singular continuous Fourier spectra, such as the Thue-Morse system. In mathematics, the Thue-Morse sequence is considered to be the prototype of a substitutional aperiodic symbolic map. It has been shown that the Thue-Morse patterns can give rise to coherent multiple wave scattering. The infinite product comes with:

$$\prod_{i=0}^{\infty}\left(1 - x^{2^i}\right) = \sum_{j=0}^{\infty}(-1)^{t_j}x_j$$

where $t_j$ is the $j_{th}$ element if j=0. The Thue-Morse pattern can be generated by the inflation rule:
1→10,0→01
The Thue-Morse sequence continues:
1→10→1001→10010110→1001011001101001 . . .

A 2D Halton pattern can be introduced by applying two different generation rules along the horizontal and the vertical directions based on different co-prime numbers, alternatively. To generate 2D Halton quasi-random patterns, the sequence is generated on a prime "2" by dividing the interval (0,1) in half, which gives:

$$\frac{1}{2}, \frac{1}{4}, \frac{3}{4}, \frac{1}{8}, \frac{5}{8}, \frac{3}{8}, \frac{7}{8}, \frac{1}{16}, \frac{9}{16},$$

Equivalently, generating the sequence on prime "3" gives:

$$\frac{1}{3}, \frac{2}{3}, \frac{1}{9}, \frac{4}{9}, \frac{7}{9}, \frac{2}{9}, \frac{5}{9}, \frac{9}{9}, \frac{1}{27},$$

When paired, the result is a sequence of points in a unit square. By doing so, the star discrepancy appears as a converged tendency with increased point number. This method provides a way to avoid the clumping and gapping in the pattern formed by 1D sequences.

Figure 7:
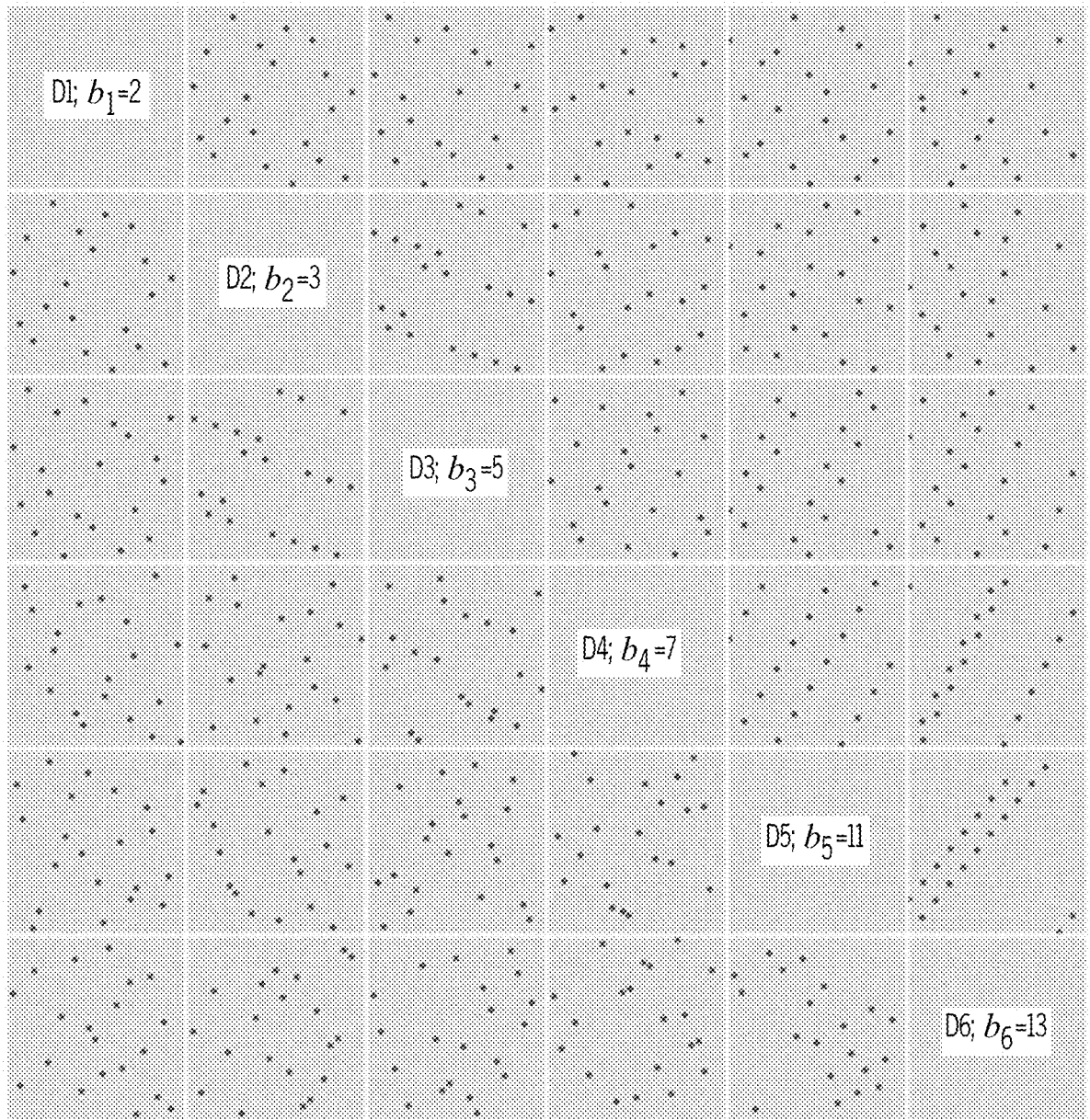
FIG. 7 shows two-dimensional Halton sequences generated from a combination of primes from dimension 2 to dimension 13; the upper right quadrants are formed by a 1D standard Halton sequence, and the lower left quadrants are formed by an optimized sequence.

For any binary 2D pattern, the rectangle unit can be used as building blocks that are small enough to digitize the 2D pattern and map it to an m-row-by-n-column binary matrix, like a digital image in pixels. In other words, each unit building block in a 2D nanostructure pattern stands for either a pit (i.e., "1" or a black building block in a 2D matrix pattern) or a land (i.e., "0" or a white building block in a 2D matrix pattern), and its position in the matrix is defined by a pair of integer tuple (x, y) as its coordinate, where 1≤x≤m, 1≤y≤m (FIG. 7). In doing so, a one-to-one mapping can be established between a real 2D pattern and a matrix where each individual element can be programmed to achieve the exact desired 2D pattern. Based on this concept, three approaches can be introduced to develop the desired binary 2D quasi-random patterns for light manipulations, namely: 1) converting 1D binary sequences to 2D quasi-random patterns; 2) directly generating 2D quasi-random patterns; and 3) digitalizing the existing 2D quasi-random patterns in other forms (e.g., channel and particle forms).

Since connections are observed between substitutional sequences and their optical properties on spatial correlations, multiple widely used substitutional binary sequences (e.g., Fibo, TM, RS) are selected to generate 2D QRPs. Each binary element (i.e., 1 or 0) in the sequence is presented by a unit square (1→pit, 0→land) in the 2D geometry, and the entire binary sequence is mapped to the 2D space in the shape of an Archimedes spiral arrangement, which is commonly found in nature (e.g., sunflowers) due to its superior light capture capability. By doing so, the binary substitutional sequence can be infinitely extended, and a scalable binary 2D pattern is created.

Some converted 1D sequences do not exhibit quasi-random structure properties in high dimensions, such as the Halton sequence, the Sobol sequence and the d-dimensional Kronecker sequence. These sequences use different coprime numbers ($\geq 2$) or bases in each dimension to fill space to get a highly uniform property. Due to dimensionality, such sequences suffer from the correlation problem as manifested in higher dimensional projections due to poor quality of multi-dimensional coverage. These correlations cause the Halton sequence to have poor two-dimensional projection for some coprime numbers. For example, for primes "11" and "13," the first 8 of generated points would have perfect linear correlation (FIG. 7). Therefore, coprime numbers "2" and "3" are determined to avoid the correlation problem generated by higher primes.

The 2D lattice method can also be employed to directly assign 1s/pits and 0s/lands to each unit square in the 2D pattern according to their coordinates (x, y). For instance, a 2D Halton pattern can be achieved by first generating two decimal Halton sequences/vectors, $x=\{x_1, x_2, \ldots x_i\}$ and $=\{y_1, y_2, \ldots y_i\}$, with two co-prime numbers, and then assigning 1s/pits for each $(x_i, y_i)$, i=1, 2, . . . i and leaving the rest units to be 0s/lands. The generation rule ensures that any 2D Halton pattern is a quasi-random pattern.

Principally, all 2D patterns, including popular channel and particle types of quasi-random patterns, can be projected onto digital greyscale photos/images of various resolutions. Using the finite element method, each pixel on the photo can directly represent either a single black (i.e., 0→land) or a white (i.e., 1→pit) unit square block by enhancing the contrast and other image processing technologies. Doing so provides an efficient method to reconstruct and further optimize existing 2D quasi-random patterns without relying on specific physical intuition (e.g., filling ratio, volume fraction, etc.) as other methods do.

Since quasi-random patterns are in between a perfect order and a complete random pattern array, various concepts have been proposed, including SDF or two-point correlation, to design and tailor the quasi-random patterns for optimal optical performance, yet most of them usually lack a connection between quasi-random pattern design and structure descriptors. It has been reported that different degrees of surface randomness can contribute to the enhancement of the light-trapping capacity caused by irregular surfaces. The evaluation of a surface's randomness is an alternative guidance to assist the quasi-random pattern design.

The main geometrical factors for evaluating the effect of surface randomness are nanostructure features (e.g., depth/height, shapes, pitch sizes, etc.) and spatial arrangement. For convenience, the nanostructure feature and depth (height) are fixed (as pitch size of 400 nm and height of 120 nm), and the focus here is on the effect of the nanostructure arrangement on surface randomness. Thus, the geometric discrepancy of a 2D surface is imposed to calculate its uniformity, which has a negative correlation to randomness and is expected to assess its surface randomness and related optical performance. By doing so, the connection between the complicated physical nanostructure model and a mathematical computational model is bridged to prevent tweaking too many design variables (e.g., filling ratio, pitch sizes, and depth) associated with higher dimensionality ($\geq 2$ dimensions) for simulations and experiments.

Without loss of generality, in a d-dimension finite even-distributed binary mesh space $I^d \in [0,1]^d$, where each unit is occupied by either 1 or 0, if there are N units of 1s (i.e., $X=\{x_0, x_1, \ldots x_{N-1}\}$) and the rest are all 0s, the discrepancy of a rectangular sub-space J in $I^d$ is defined as:

$$D_N(J) = \mu_x(J) - \mu(J)$$

where J represents a subset in $I^d$, $\mu_x(J)$=(The number of points in J)/(Total points, i.e., N)$\in [0,1]$, and $\mu(J) \in [0, 1]$ is the Lebesgue Measure of J. In other words, $\mu(J)$ is the fraction of X in J over $I^d$, while $\mu(J)$ is the fraction of J over $I^d$. For $I^d$ of d=1, 2, 3, $\mu(J)$ turns out to be the fraction of length, area, and volume, respectively. The dimension of space is limited as "2." Generally, the larger discrepancy in 2D area indicates more random (i.e., less uniform) distribution of a set of points over the area, and vice versa.

$$\prod_{i=0}^{d} [a_i, b_i], 0 \leq a_i < b_i < 1$$

Applying this concept to the 2D quasi-random pattern designs, each box is painted into black if it is assigned "1", and white otherwise. Therefore, the discrepancy becomes:

$$D_N = \left| \frac{\text{Number of black boxes in } J}{\text{Total black boxes}} - \frac{A}{B} \right|$$

where A is the area of J, and B is the area of total boxes in $I^2$. An example of Eq. (60) is where 12 contains 31×78 unit squares in total and 581 black ones, while a subset J has 11 black boxes $$D_N = \left| \frac{11}{581} - \frac{5 \times 7}{31 \times 78} \right| \approx$$

in a total of 5×7 squares. Thus, the discrepancy of J becomes 4.45×10⁻³. This is one single case for the discrepancy of this particular J, which cannot represent the discrepancy (i.e., the degree of randomness) of the entire space.

Being more trackable than the varied values of discrepancies for all subsets J in $I^2$, the maximal deviation of all possible discrepancies, the star discrepancy ($D^*_N$), is employed as a criterion to evaluate the degree of surface randomness of the pattern morphology.

$$D^*_N = Sup_{J \in I} |D_N(J)|$$

Figure 8A:
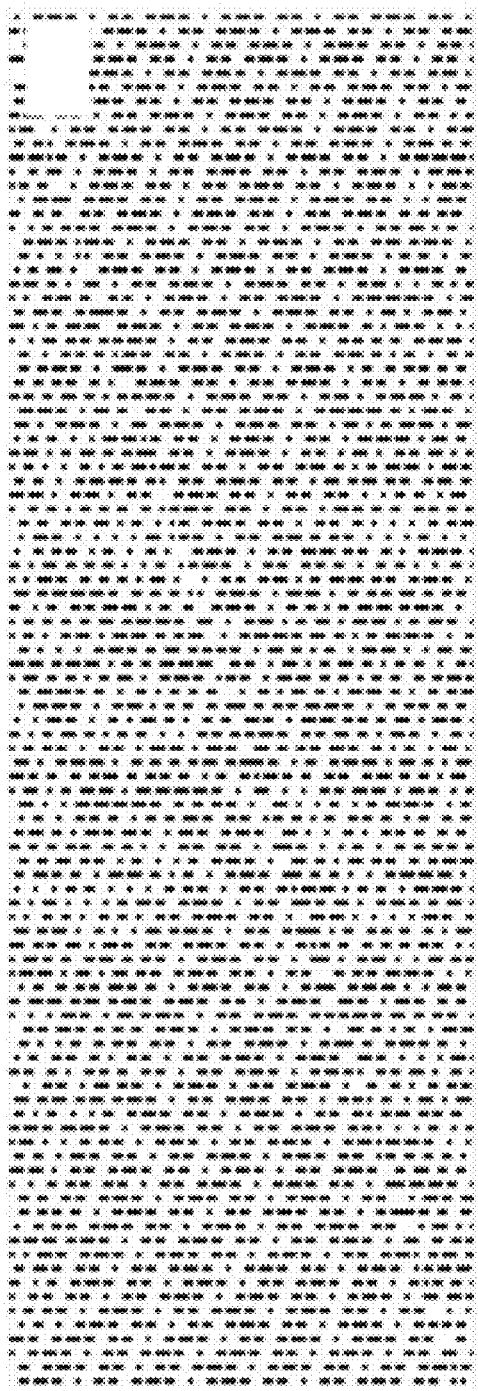
FIG. 8A shows simulated quasi-random structures with low discrepancy value (more uniform).
Figure 8B:
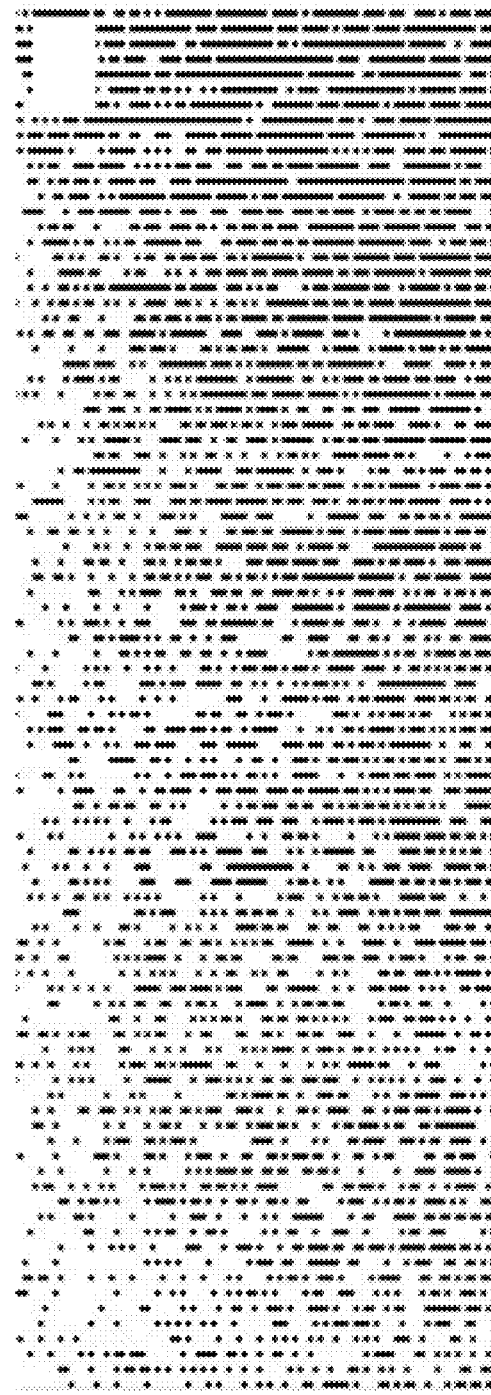
FIG. 8B shows simulated quasi-random structures with high discrepancy value (more random).

The computation results show that a pattern with more randomness (i.e., less uniformity) has a higher $D^*_N$. FIG. 8 shows two different degrees of surface randomness for two patterns with the different $D^*_N$. A pattern is quasi-random if:

$$D^*_N \leq c \frac{(\log N)^2}{N}$$

where c is a constant coefficient, and N is the total number of 1s in the matrix (i.e., pits).

Figure 9B:
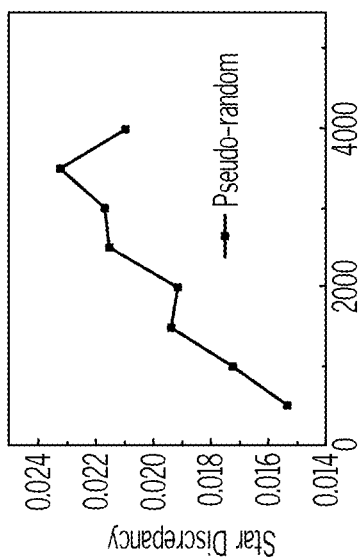
FIG. 9B shows the tendency of the star discrepancy with increased unit square based on the quasi-random pattern.
Figure 9C:
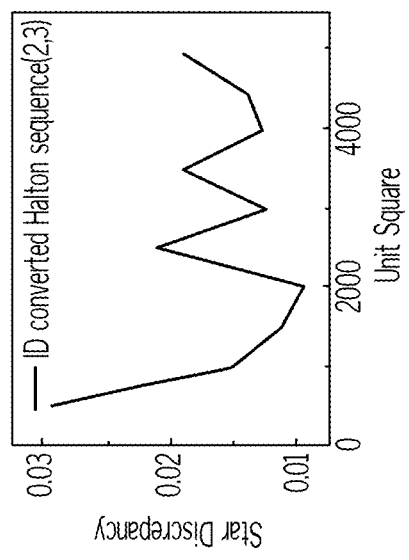
FIG. 9C shows the tendency of the star discrepancy with increased unit square based on the 1D Halton (2,3) sequence.
Figure 9A:
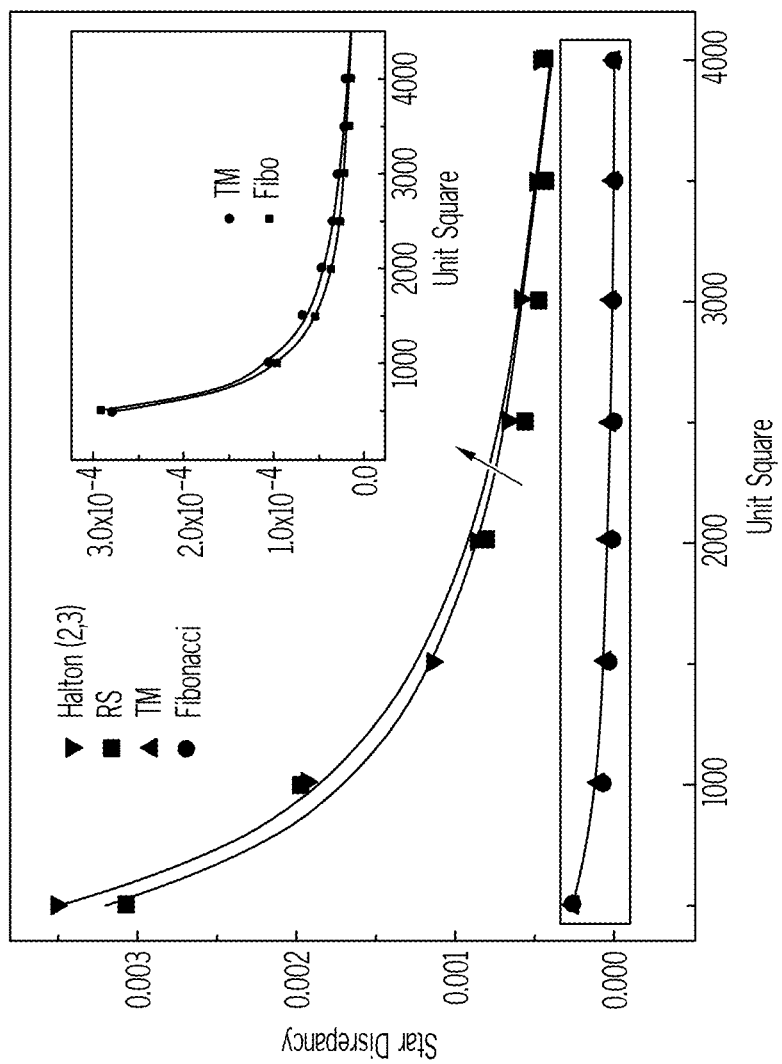
FIG. 9A shows the relationship between star discrepancy and pattern scale on different quasi-random patterns (i.e., RS, TM, Fibo, Halton (2,3)).

The star discrepancies of various 2D patterns with increasing pattern size scale are examined and plotted (FIG. 9). Three 2D quasi-random patterns are generated based on corresponding 1D binary sequences (i.e., RS, Fibo, TM) and the fourth (i.e., Halton (2,3)) is generated directly by assigning binary values to each unit building block in the mesh space. The size of each 2D pattern increases from 500-unit building blocks to 4000-unit building blocks in each dimension (x and y axis). Detailed $D^*_N$ values for each size are listed in Table 2.

TABLE 2

| | Sequence | | | |
|---|---|---|---|---|
| Unit | RS | Fibo | TM | Halton (2, 3) |
| 500 | $3.08 \times 10^{-3}$ | $2.92 \times 10^{-4}$ | $2.79 \times 10^{-4}$ | $3.51 \times 10^{-3}$ |
| 1000 | $1.98 \times 10^{-3}$ | $9.47 \times 10^{-5}$ | $1.04 \times 10^{-4}$ | $1.96 \times 10^{-3}$ |
| 1500 | $1.17 \times 10^{-3}$ | $5.33 \times 10^{-5}$ | $6.58 \times 10^{-5}$ | $1.17 \times 10^{-3}$ |
| 2000 | $8.31 \times 10^{-4}$ | $3.60 \times 10^{-5}$ | $4.70 \times 10^{-5}$ | $8.73 \times 10^{-3}$ |
| 2500 | $5.84 \times 10^{-4}$ | $2.59 \times 10^{-5}$ | $3.17 \times 10^{-5}$ | $6.75 \times 10^{-4}$ |
| 3000 | $4.93 \times 10^{-4}$ | $2.22 \times 10^{-5}$ | $2.58 \times 10^{-5}$ | $5.88 \times 10^{-4}$ |
| 3500 | $4.34 \times 10^{-4}$ | $1.63 \times 10^{-5}$ | $1.94 \times 10^{-5}$ | $4.92 \times 10^{-4}$ |
| 4000 | $4.53 \times 10^{-4}$ | $1.41 \times 10^{-5}$ | $1.75 \times 10^{-5}$ | $4.87 \times 10^{-4}$ |

FIG. 9 indicates that 1) all four fitting curves of $D^*_N$ over P approximately obey the relevant equation, confirming that 1) these patterns are quasi-random; and 2) the order of surface randomness (i.e., discrepancy) among these patterns remain unchanged as the pattern size scales up (i.e., Halton (2,3)≈RS>TM>Fibo), implying that computing $D^*_N$ in small scale can cover the large scale, reducing the computational complexity. In comparison, a pseudo-random pattern may have an unpredictable tendency of $D^*_N$ over pattern size, and it indicates that if the discrepancy value curve of a pattern cannot fit into the relevant equation, the pattern does not have a quasi-random property. It can also explain why a 2D Halton quasi-random pattern cannot be designed using a 1D converted binary sequence. FIG. 9 shows the 1D Halton (2,3) sequence converted to a 2D quasi-random pattern by spiral arrangement. The tendency with increased pattern size and N points (i.e., 1s) does not show the convergency, which means the re-shaped 2D pattern does not have quasi-random pattern properties.

Figure 10:
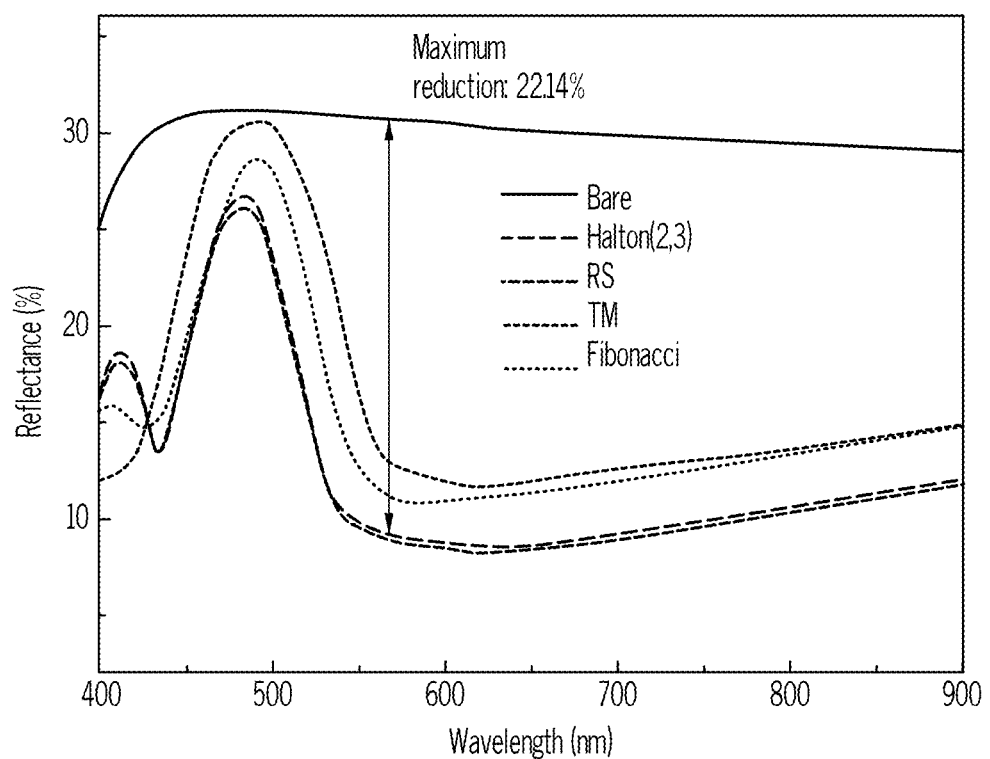
FIG. 10 shows plots of the reflectance of a thin-film solar cell (Si-based) with different quasi-random nanostructure coatings by Lumerical Finite-Difference Time-Domain (FDTD) simulations.
Figure 11A:
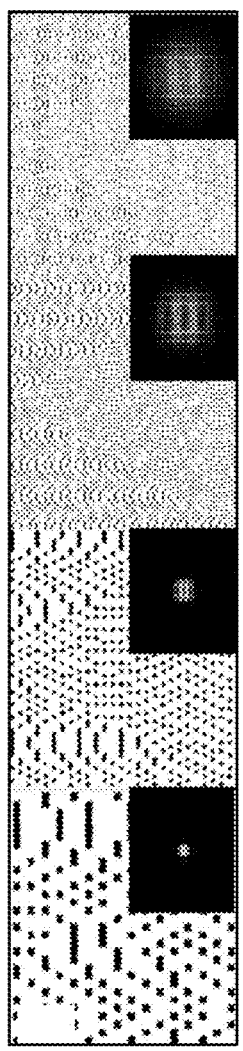
FIGS. 11A-11C show images from Fast Fourier transform of 30 unit*30 unit to 300 unit*300—unit for, FIG. 11A—Fibonacci.
Figure 11B:
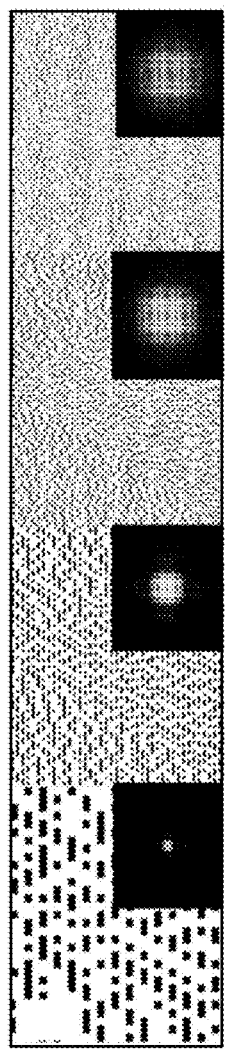
Figure 11C:
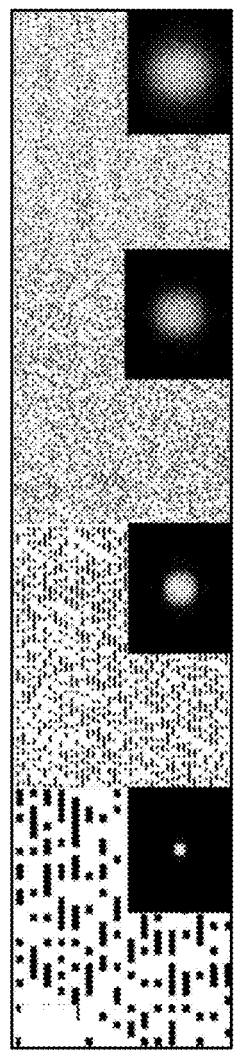
Figure 11D:
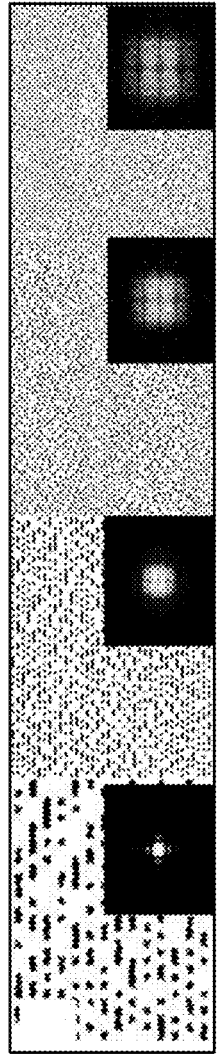
FIG. 11D—Halton (2,3) with 0.5 filling ratio.
Figure 12A:
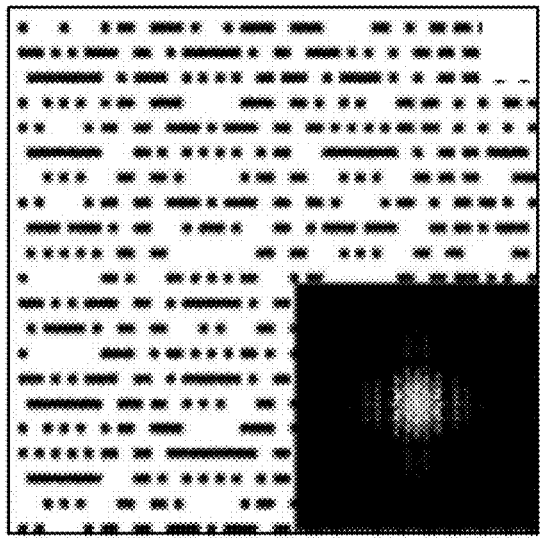
FIGS. 12A-D show different quasi-random patterns and their Fourier Transform Analysis for, FIG. 12A—Fibonacci sequence.
Figure 12B:
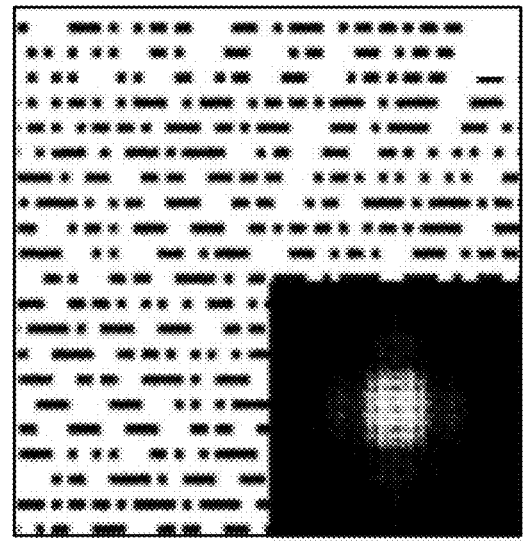
Figure 12C:
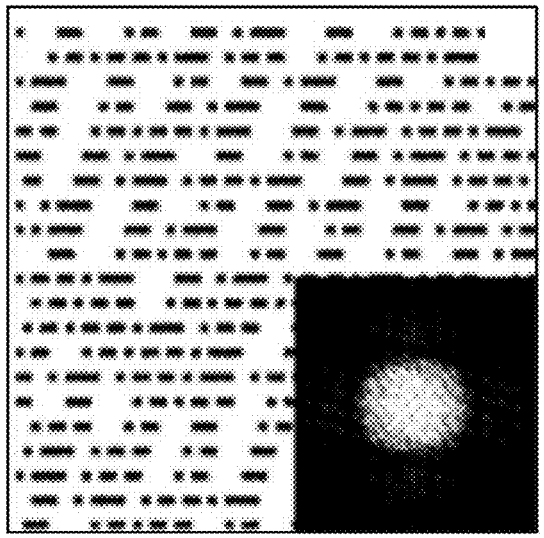
Figure 12D:
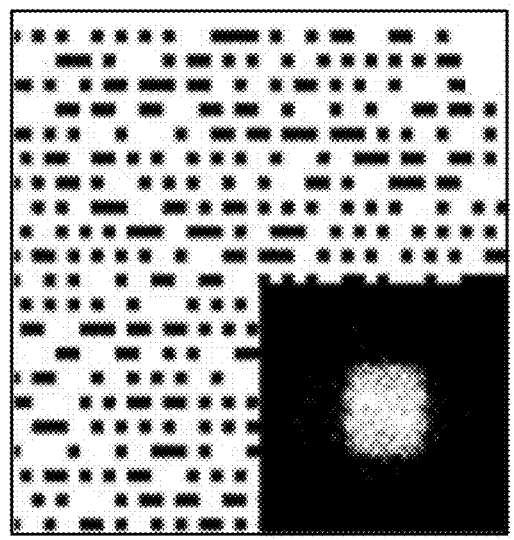
Figure 12E:
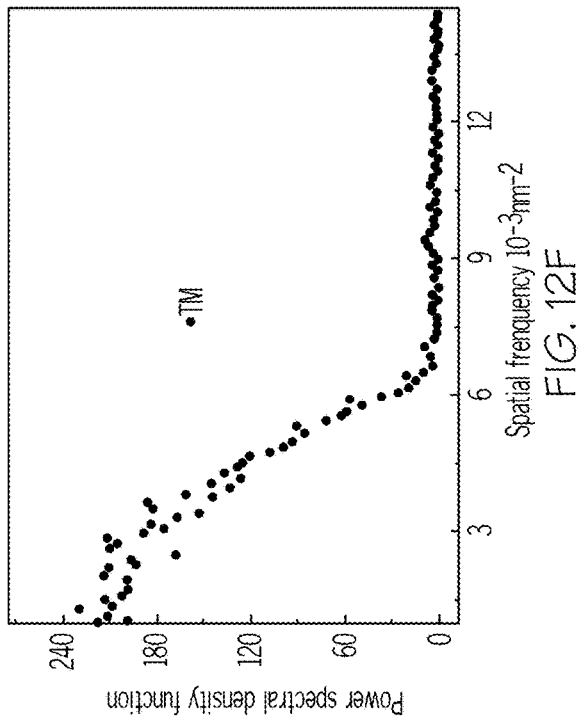
FIGS. 12E-12H show graphical comparisons of spectral power density functions for representing quasi-random structures.
Figure 12F:
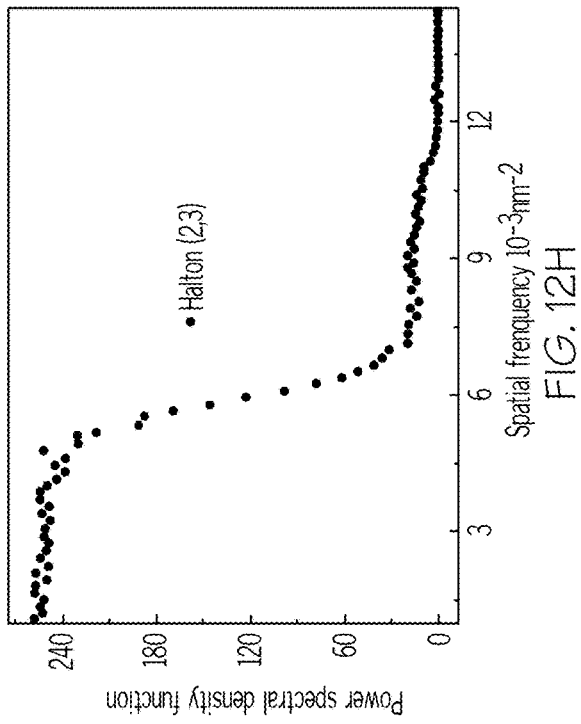
Figure 12G:
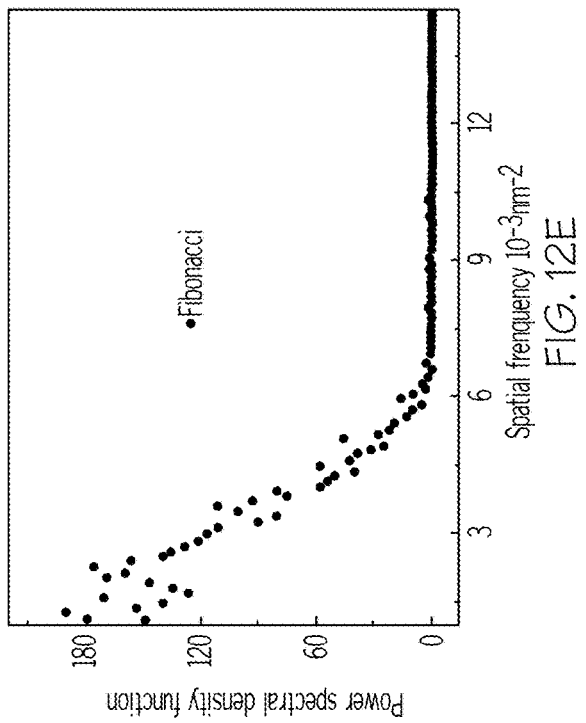
Figure 12H:
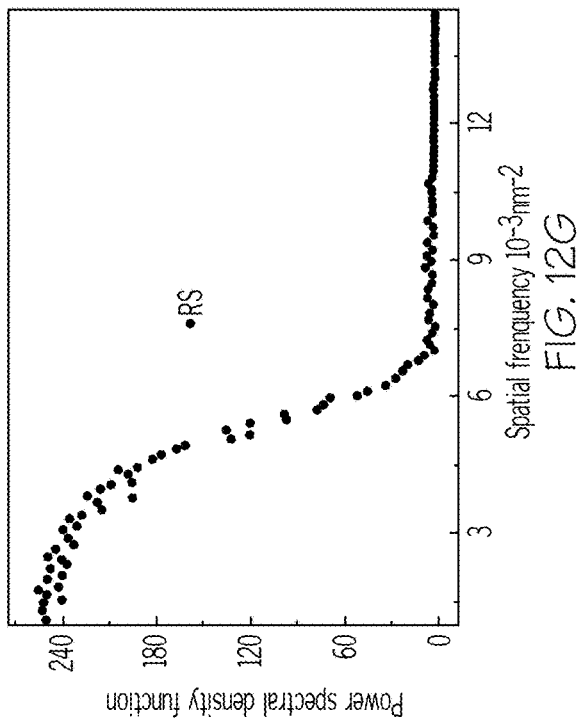
Figure 14B:
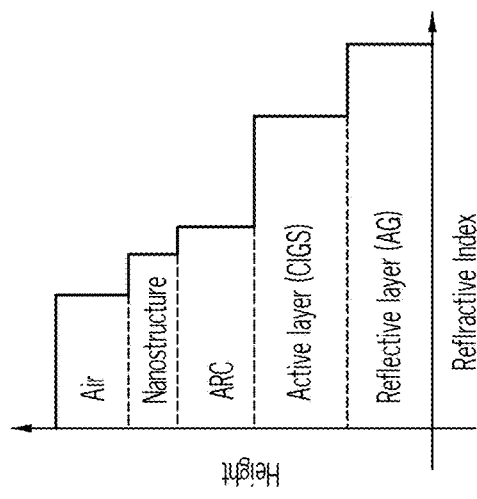
FIG. 14B shows the relationship between height position and material refractive index.
Figure 14A:
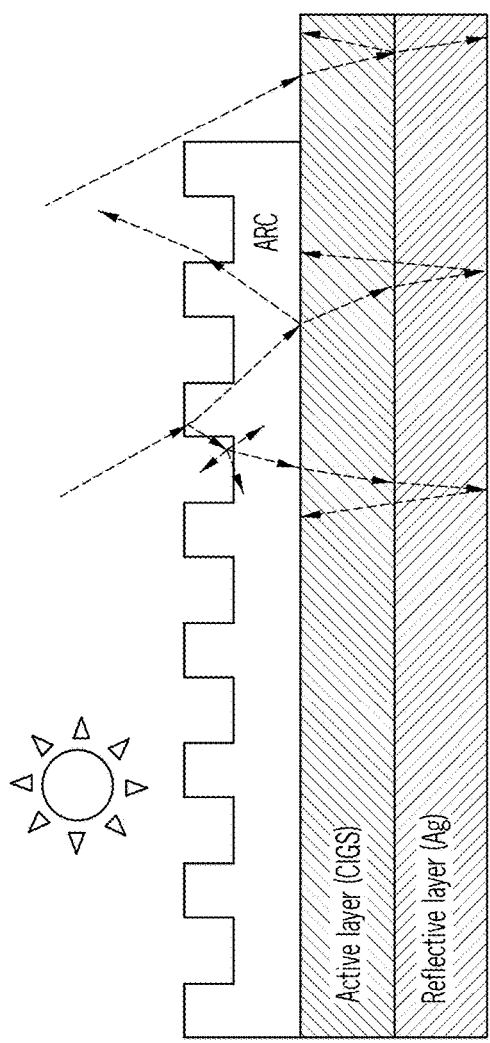
FIG. 14A shows a schematic illustration of light behavior for solar device with/without nanostructured coating.
Figure 14D:
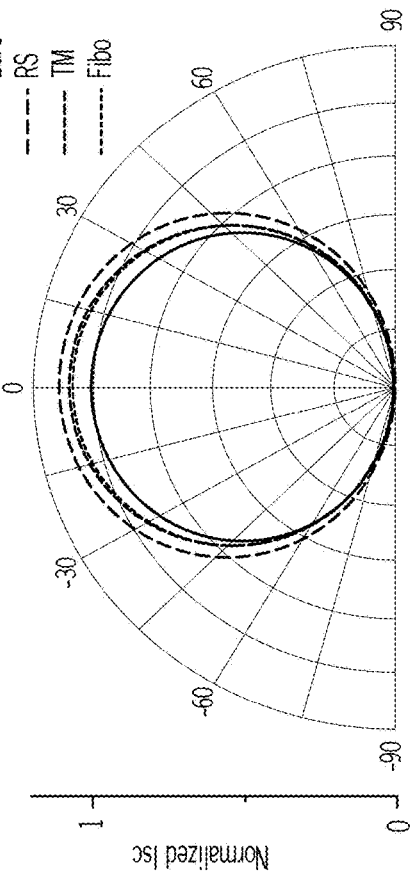
FIG. 14D shows the angular dependence of a normalized photocurrent with/without the nanostructured coatings.
Figure 14C:
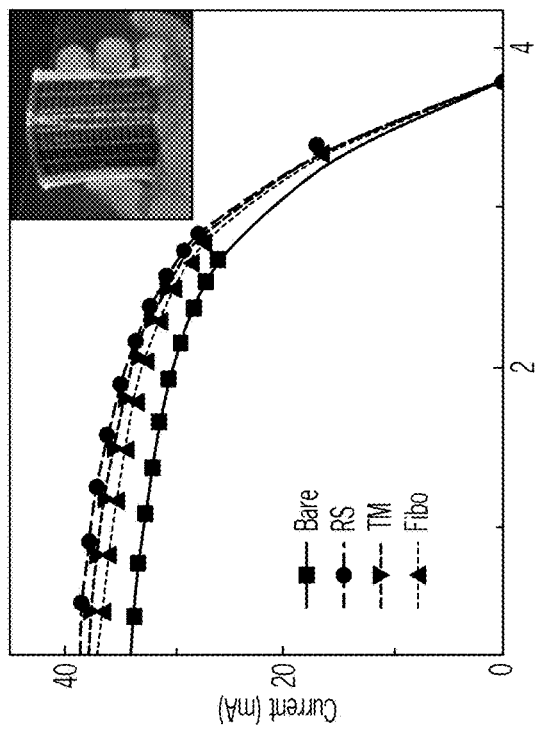
FIG. 14C shows the I-V curve of a thin-film solar cell (a-Si:H) with the different nanostructured coatings (RS, TM, Fibo) and without (solid black line) any coatings.
Figure 15A:
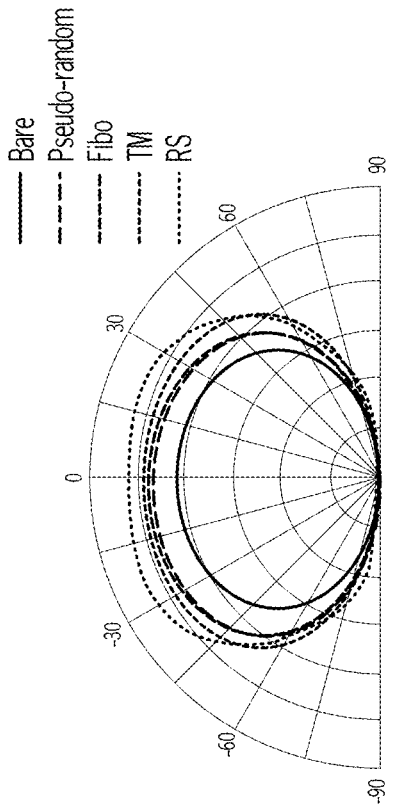
FIG. 15A shows the I-V curve of a thin-film solar cell (CIGS) with the different nanostructured coatings and without (solid black line) any coatings.
Figure 15B:
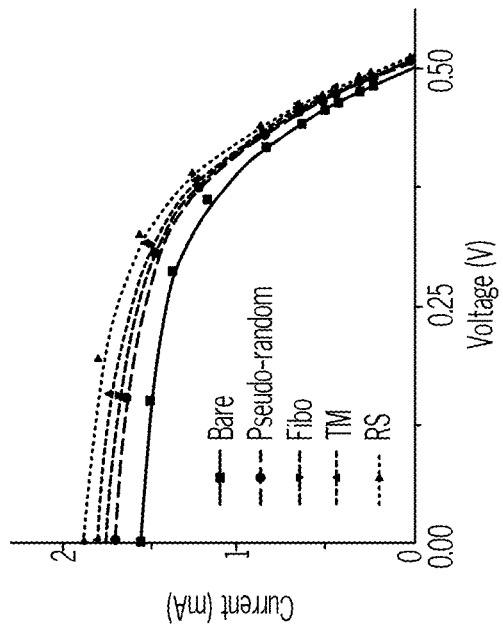
FIG. 15B shows the I-V curve of a photodiode device with the and without (solid black line) any coatings.
Figure 15C:
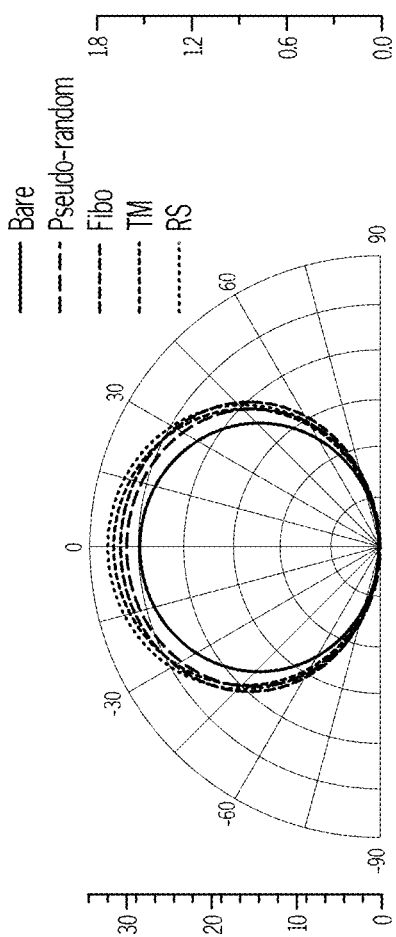
FIG. 15C shows the omnidirectional distributions of a CIGS thin-film solar cell with different nanostructured coatings.
Figure 15D:
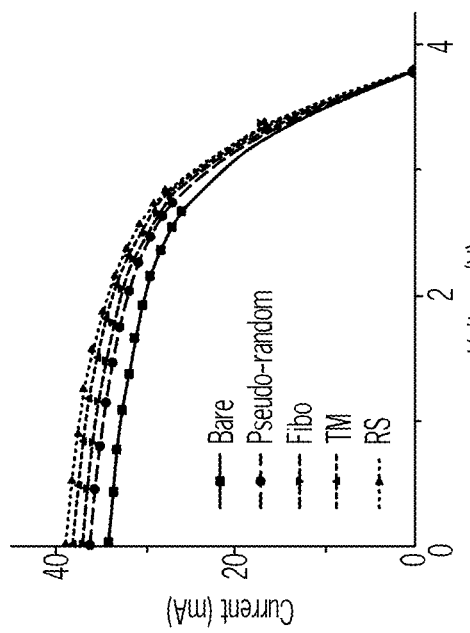
FIG. 15D shows the omnidirectional distribution of a photodiode device with different nanostructured coatings.

To investigate how $D^*_N$ is related to the optical performance, a numerical analysis of the electromagnetic field features is performed using the Finite-Difference Time-Domain (FDTD) method. 3D schematic models of each quasi-random nanostructure are established with a Si-based solar cell sandwiched by a nanostructured anti-reflective coating and a silver reflector. Each quasi-random nanostructure of 500×500-unit building blocks is simulated over an 11 μm×11 μm area with perfectly matched layers (PML), and the mesh resolution is configured as 0.01 μm. The reflectance is calculated through the field monitor located above the plane wave source (FIG. 10). The results show that the reflectance of the four quasi-random pattern nanostructures coated on the Si-based solar devices follows the order: Halton (2,3)≈RS<TM<Fibo in the almost entire visible light spectrum, opposite to the relationship presented in $D^*_N$, revealing that a higher degree of randomness improves the antireflection capability in wavelengths of 500 nm~900 nm. It also presents an enhancement of 2D quasi-random nanostructure coated Si-based solar cells in a broader spectral range, rather than the distinct power peaks observed in periodic nanostructures.

To double/cross-check the FDTD optical simulation of the four quasi-random patterns, spectral density function (SDF) can be performed to validate the results. Traditionally, SDF is employed to evaluate and reconstruct the optical and morphological characteristics for various nanostructures. However, it may not be the optimal approach to modify the surface morphologies for better light-trapping capacity due to the unpredictable SDF distortion and defects caused by the discrete pixels in the finite element meshing in the SDF-to-spatial arrangement distribution calculations. FIG. 12 illustrates the corresponding 2D patterns, Fourier Transforms Analysis (FTA) and SDFs of each quasi-random pattern and confirms that Halton (2,3) and RS QRNs achieve a broader spectrum of energy with a higher degree of randomness in comparison to the other two QRPs. In other words, the SDF results agree well with the FDTD simulations. The FTA is determined by the distribution of the Fourier components (e.g., the effect of its shape and position). With increased pattern size, the appearance of FTA maintains the same but the size changes, which indicates that quasi-random patterns retain their properties with the pattern size increased due to the same spiral arrangement (FIG. 11).

To quantitatively characterize the quasi-random patterns, the different quasi-random nanostructure ARCs were fabricated on various thin-film solar cell devices using the optical disc technology-based soft-lithography method, as schematically shown in FIG. 13. The detailed ARC fabrication processes are explained above. The quasi-random nanostructures derived from PDMS coatings were characterized by FTA of the SEM images. FIG. 14 shows the SEM images from different nanostructures derived from the recording layers and the simulated nanostructures derived from mathematical algorithms. The SEM images indicate that the quasi-random nanostructures comprise a plurality of pits and lands arranged in a plurality of tracks. To calculate the k-value based on different photoactive and electrode materials, the photoactive material is chosen as a-Si:H, and the electrodes are made of Ag. The circles from the inner to the outer denote the solar spectrum wavelength range from 315 nm to 2.5 μm coupling with the k-values. FIG. 14 also shows that the FTA of the fabricated quasi-random nanostructures is similar to the simulated quasi-random nanostructures, which indicates that the fabricated nanopatterns are like those predicted computationally.

In addition to the FDTD simulation and verification, photocurrent generational capability was measured. To illustrate, the quasi-random pattern matrix was burned onto a blank writable optical disc and pits and lands were generated on the disk recording layer as the building blocks to create quasi-random nanostructures. The light absorption of various nanostructures over the entire solar spectrum is evaluated by measuring the current-voltage characteristics under AM 1.5G illumination (FIG. 14). The enhancement in absorption is interpreted by an increase in short-circuit current ($I_{sc}$) from a bare module (34.178 mA) to the solar device with RS quasi-random nanostructures (38.816 mA), a maximum of 13.57% improvement on photon-to-electricity efficiency. Multiple factors contribute to this improvement: 1) the nanostructured ARC forms a gradient refractive index $\eta_{Ag} > \eta_{a\text{-}si:H} > \eta_{PDMS} > \eta_{PDMS\text{-}RS} > \eta_{air}$ (FIG. 14); 2) the quasi-random nanostructure induces the Mie-scattering phenomenon, which normally takes place in the spectral range close to the multiple of the pit length and generates a strong forward scattering (i.e., the same direction as the incident light); 3) the gradient $I_{sc}$ improvements between each quasi-random pattern are matched to their increased degrees of surface randomness.

Since the angle of solar irradiation affects the optical loss by Fresnel's law, the omnidirectional light-harvesting capability was observed. For an increased incident angle θ, the path of the propagated light from outside to inside will be changed, and the efficiency of the solar devices will be enhanced by optical redirection-assisted light-trapping. Therefore, the $I_{sc}$ of the Si-based devices with and without ARC was measured for different angles of the light incidence varying from 0°~75°. FIG. 14 indicates an average of 10% photocurrent (up to ~12%) is observed for the Si-based solar cell coated with RS quasi-random nanostructure in a wide incident-angle range of 0°~75°, suggesting an omnidirectional distribution of redirected incident light.

When the incident light is not perpendicular, the degree of surface randomness not only randomizes the angle of reflection, but it also impacts the angle of refraction and results in optical path enhancement of light as light travels a longer distance in a semiconductor. It is thus of importance to reduce the reflection loss at large incident angles to meet the demands of practical applications. For the quasi-random nanostructure patterns, two advantageous processes occur with the nanostructured coating illuminated by angular incident light: 1) light striking the pit sidewalls at microscopic scale will result in a more than 90 degree change in incident angle due to reflection on the sidewalls, as well as an increase in the length of refracted incoming light. 2) light reflecting off one pit may strike a neighboring pit or land, which results in an incident angle favorable for transmission. The reflection from a rough surface which randomizes the incident light into a random direction is also known as Lambertian reflection. A higher degree of surface randomness helps in tuning the angle of incidence and achieving the required condition leading to total internal reflection. Table 3 includes solar cell performance. $I_{sc}$, $V_{oc}$ and corresponding enhancement of a-Si:H thin-film solar devices

TABLE 3

| Samples | $I_{sc}$ (mA) | $V_{oc}$ (v) | $I_{sc}$ Improvement | Efficiency Improvement |
|---|---|---|---|---|
| Bare | 34.178 | 3.7882 | 0% | 0% |
| Fibo | 37.127 | 3.7767 | 8.63% | 8.3% |
| TM | 38.095 | 3.7881 | 11.46% | 11.46% |
| RS | 38.816 | 3.7886 | 13.57% | 13.58% |

To assess the broad practicability and adaptability of the designed nanostructures for different solar cells, we applied the fabricated quasi-random nanostructure ARCs to different solar cell generations. The quasi-random nanostructures not only avoid the optical losses by reducing the surface reflection based on surface randomness, but also generate a forward scattering effect and internal reflections inside the solar cells to increase the "optical path" for all generations of the solar cells.

FIG. 15 shows the I-V curve of the different solar cells (i.e., first generation: Si-based photodiodes, second generation: CIGS thin-film solar cells, and photodiode cell) with quasi-random nanostructure ARCs. For Si-based photodiodes, the weak absorption happens at 550 nm due to the Si material being an active layer. The pitch sizes (~400 nm) of the fabricated quasi-random nanostructures will largely have a chance to tune the 550 nm wavelength of the light into "quasi-random" waveguide mode. Moreover, for the CIGS thin-film solar cells, the internal reflections and surface reflectance reduction play important roles. Furthermore, as shown in FIG. 15, the quasi-random nanostructures have broadband and omnidirectional antireflection properties over a wide AOI, indicating that our quasi-random nanostructures have a broad adaptability for all generations of the solar cells.

Broadband optimization for reflectance in an exemplary solar device can enhance the average absorption over the visible light spectrum. Here, a patching strategy is proposed to further optimize the selected quasi-random pattern (i.e., RS as discussed in the previous section) to reduce the reflectance. For a given quasi-random pattern, we select different fixed-size square regions and slide them over the entire quasi-random pattern to calculate the discrepancy values of these regions in relation to the entire pattern. During the heuristic calculations of discrepancies for various region sizes, we have found that the histogram of discrepancy vs. region size roughly obeys a Gaussian distribution, and the maximum discrepancy value of the entire quasi-random pattern usually occurs when the region size is approximately a half of the short side of the quasi-random pattern (95% confidence interval). Empirically, optimizing this size should most significantly affect the star discrepancy value of the entire quasi-random pattern. Thus, we set the region size to be a half of the short side of the quasi-random pattern, scan the quasi-random pattern with this region size, copy the region that has the highest discrepancy and paste it to cover the region that inherits the lowest discrepancy, so that the star discrepancy of the entire quasi-random pattern can increase or converge to a larger value. In doing so, the discrepancy value converts the physical model to a mathematical model and saves us from tweaking dozens of design variables (e.g., filling ratio, pitch sizes, and depth), which could cause numerical simulation issues (e.g., diverging error) and tedious data analysis associated with higher dimensionality ($\geq 2$ dimensions).

In this optimization process, there are three characteristics that we need to confirm: 1) the size of the region with the highest discrepancy value should match the region with the lowest discrepancy value that is to be replaced; 2) the optimization target function is the star discrepancy value of quasi-random pattern (QRP) instead of any other physical descriptors (e.g., absorption coefficient); and 3) with a number of replacement/patching iterations, the discrepancy value of the entire quasi-random pattern will converge to a stable range. Once the three objects are fulfilled, the reflectance simulations for the newly generated/optimized patterns are conducted via Numerical FDTD to validate the optimized optical performance of the new quasi-random patterns.

Figure 16B:
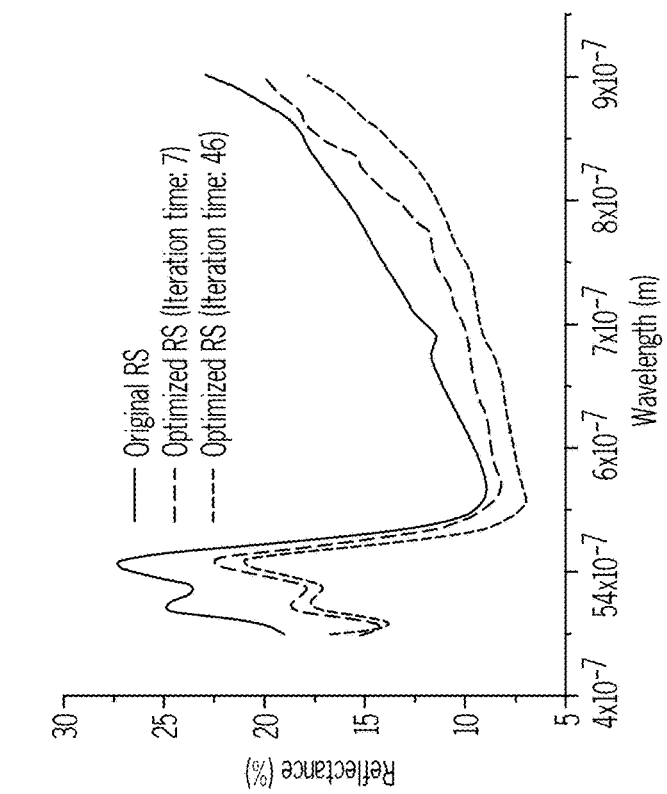
FIG. 16B shows simulated reflectance spectrum of the quasi-random nanostructure, before and after optimization over the wavelength range from 400 nm to 900 nm.
Figure 16A:
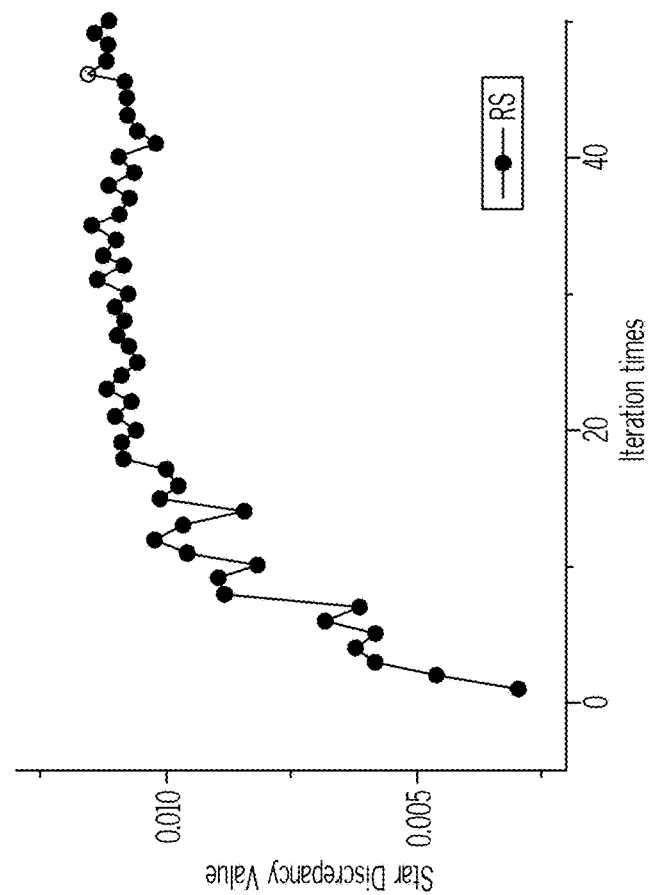
FIG. 16A shows the Optimization history of RS quasi-random nanostructure star discrepancy with 50 iteration times.
Figure 17B:
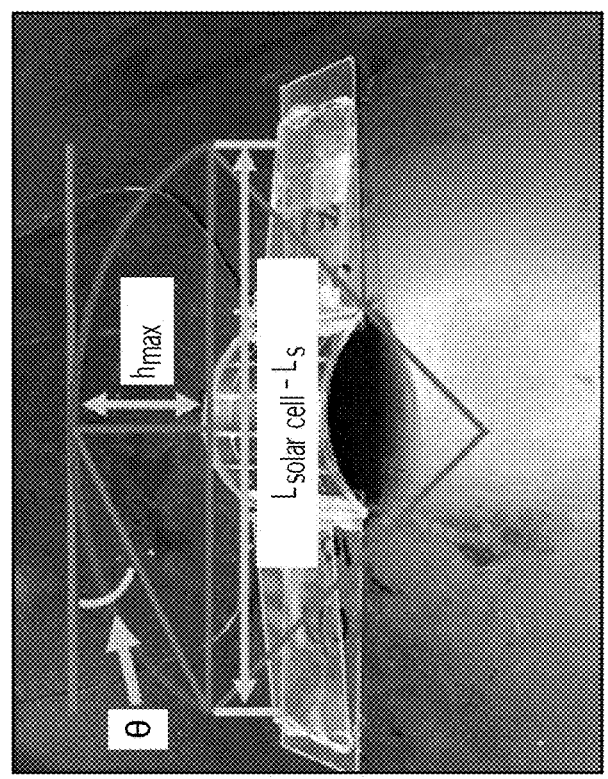
FIG. 17B shows the schematic of the experiment process and its bending angle calculation.
Figure 17A:
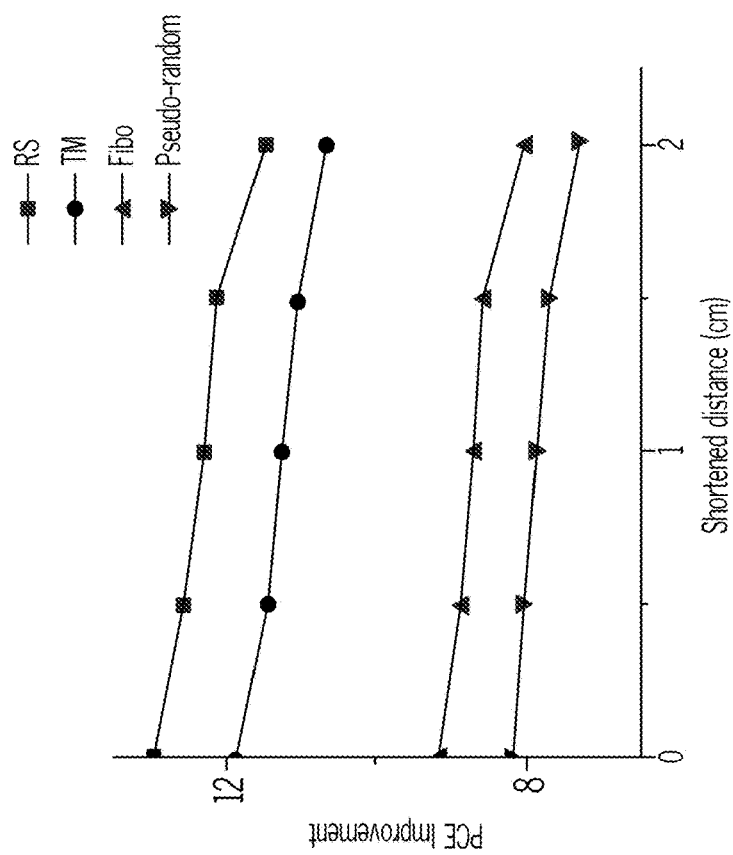
FIG. 17A shows the PCE improvement of the different bending angles applied on the thin-film solar devices with our nanostructured coatings.
Figure 17D:
FIG. 17D shows the illustration of the flexibility of the thin-film solar cell.
Figure 17C:
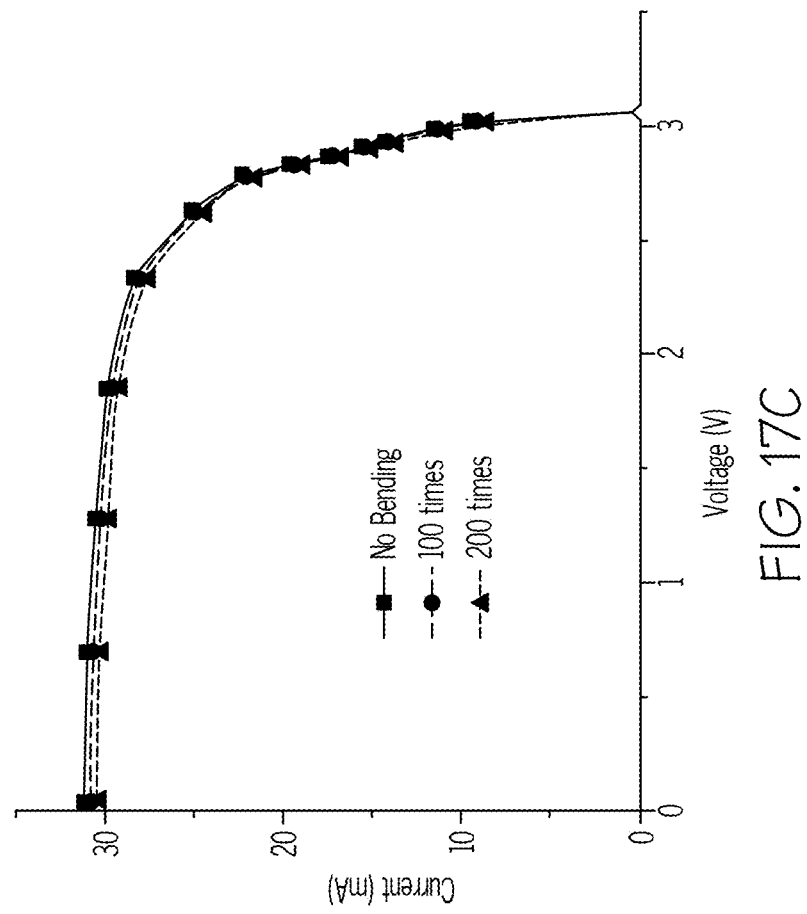
FIG. 17C shows the I-V curve with different bending times.

We assume that the original RS pattern has a size of 501 units×501 units, and we compute the discrepancy values of all possible 250 units×250 units regions, which approximately cover ¼ of the entire QRP (x-y plane). Based on Eq. (60) and (61), once the region with the highest discrepancy value and the one with the lowest discrepancy value in the original RS pattern are recognized respectively, the patching process is to directly copy the former to cover the region of the latter. This process can be further repeated iteratively until the star discrepancy value converges to a stable zone. The diagram of the QRP star discrepancy vs. the number of optimization/patching iterations is depicted in FIG. 16. The star discrepancy of the original RS pattern (without patching optimization) starts at 0.00298, and the star discrepancy value tends to be stable along with the optimization iterations, while the maximum value reaches to 0.01156 (denoted by the red dot at the 46$^{th}$ iteration).

For further validation, FDTD simulations are conducted on the original RS pattern and two of its optimized patterns: the original pattern (star discrepancy value: 0.00298) and the optimized pattern at the 7$^{th}$ iteration (star discrepancy value: 0.00618). The structural parameters in this case are set to be pitch size=400 nm and height=120 nm. A broadband optimization of the QRN light-trapping performance is observed over the solar spectrum from 400 nm to 800 nm and is plotted in FIG. 16. The two optimized QRNs with drastically increased star discrepancy gradually reduce the surface reflection by up to a 25% decrement in the strong reflectance region (~500 nm). Optimizing the QRNs based on their star discrepancy values instead of tailoring the QRN physical descriptors in real-space provides a fast and efficient way to avoid thousands of optical simulations to tune the surface morphology parameters for QRNs.

Flexibility is a desirable feature of the second generation solar cells for some specific applications, such as outdoor activities and aerospace. As the exemplary ARCs are made of PDMS, which are transparent flexible layers, characterization of flexibility and bendability are useful for the thin-film solar cells and its ARCs. It was found that the nanostructures could enhance the flexibility and the bendability of the thin-film PV devices. Nano-scale thickness renders the thin-film solar cells and the ARCs with respectable flexibility, and FIG. 17 shows a photograph of a flexible device. To demonstrate the robustness of the whole device, the PCE improvement of the device with/without QRN ARCs under a bending angle from 0° to 90° was plotted in FIG. 17. The change of light projection area on the device during a bending process is considered when calculating the power conversion efficiency. The bending angle θ has a relationship with the shortened distance Ls and the maximum height ($h_{max}$) of the bent cells with reference to the supporting surface $$\theta = \arctan\left(\frac{2h_{max}}{L_{solar cell} - L_s}\right).$$

The PV devices characterized here to have a length ($L_{solar cell}$) of 6 cm. Therefore, the whole device was bent with a shortened distance of up to 2 cm when the bending angle was 90°, as shown in the inset photograph of FIG. 17, while maintaining ~85% of the improved efficiency. The light illumination area of the device was decreased when the shortened distance was increased. This led to a reduction of the input optical power on the device. Therefore, the device PCE improvement was a relative enhancement by considering the change to the device's actual projection area.

To examine the bendability of the devices, we used the same thin-film solar cells with a length of 6 cm and bent them to a shortened distance of 4 cm by applying mechanical force up to 200 cycles. After 100 cycles and 200 cycles, the device electrical performance was measured repetitively. The maximum bending angle of a flexible device was found to be 90°. Beyond that, the flexible bare thin-film solar cell is prone to break the active layers. The effect of the bending cycles on the $I_{sc}$ of the device is presented in FIG. 17. As a result, the $I_{sc}$ of the device decreased from 32.2 mA to 31.5 mA after 200 bending cycles. During the bending cycles, microcracks and delamination could be produced at the interfaces between different interfaces of the thin-film solar cells, which would deteriorate the device and increase the series resistance of devices. With proper packaging and placement of the films in the mechanical neutral plane, the bending side effects can be minimized, and performance degradation upon bending is expected to be much less.

III. Enhanced Broadband Omnidirectional Absorber Utilizing 2D and 3D Deterministic Quasi-Random Nanostructures For Thin-Film Solar Cells The spatial distribution refers to simultaneously controlling the distribution of surface morphology and arrangement at the x-y plane as well as heights along the z-direction in 3-dimensional space. Programming binary data is proposed as an innovative method to describe the spatial distribution of the 3D deterministic disordered nanostructures. It provides an efficient way to build up a connection between the physical model and the mathematical model. Thus, two individual sets of binary data can be generated by different approaches to describe the spatial distribution in x-y-z space. In an exemplary embodiment, the binary matrixes are generated for surface morphology and arrangement at the x-y plane, and a string of binary data is also generated for the randomized heights along the z-direction. For the x-y plane, there are two main methods to rationally design the 2D patterns of nanostructures: 1) a binary matrix for 2D patterns at the x-y plane is generated by arranging the original 1D binary sequences in an inside-out Archimedean spiral way; 2) a binary matrix for 2D patterns at the x-y plane by directly using 2D sequence generators to generate the 2D binary matrix. For the z-direction, a string of binary data is generated using a quasi-random generator, and the binary string is divided into sub-intervals. For sake the of comparison, the spatial distributions are classified as periodic and quasi-random nanostructures.

For any binary 2D pattern, the rectangle unit can be used as building blocks that are small enough to digitize the entire 2D pattern and map it to an m-row-by-n-column binary matrix, like a digital image in pixels. In other words, each unit building block in a 2D nanostructure pattern stands for either a "pit" (i.e., "1" or a black building block in a 2D matrix pattern) or a "land" (i.e., "0" or a white building block in a 2D matrix pattern), and its position in the matrix is defined by a pair of integer tuple (x, y) as its coordinates, where 1≤x≤m, 1≤y≤m. Based on this concept, there are three approaches to develop the desired binary 2D QRPs for light manipulations, namely: 1) converting 1D binary sequences to 2D QRPs; 2) directly generating 2D QRPs; and 3) digitalizing the existing 2D QRPs in other forms (e.g., channel and particle forms).

For the randomized heights of nanostructure design along the z-direction, the binary sub-intervals with assigned height values are generated for pits to ensure the pits' heights along the z-direction have pseudo-random or quasi-random distribution by the following method: A string of binary data (like {0100110 . . . }) is generated using a 1D pseudo-random or quasi-random generator. Then, the string will be divided into m sub-intervals with n bits inside to meet different requirements. These sub-intervals with different height scales are assigned to pits in an orderly fashion. The same sub-interval represents the same height scale. In doing so, the pits' heights along the z-direction can be quasi-random distribution. In a basic embodiment, we select a total of 3 bits in a sub-interval, like {010}, {011} . . . . The total number of height scales becomes $2^3$-8 scales. Then, the sub-intervals representing different height scales are assigned to each pit, followed by the 2-dimensional arrangement (inside-out spiral). Eventually, the 2D deterministic disordered pattern can be extruded to be a 3D deterministic disordered nanostructure design, whose spatial distribution dominates light-trapping properties.

For the randomized heights of nanostructure design along the z-direction, the number of the height scales is determined by binary data selection. A binary data set has 3 bits. The total number of height scales is $2^n$=8. The total number of height scales becomes $2^3$=8 scales. The eight height scales are set as 50 nm, 60 nm, 70 nm, 80 nm, 90 nm, 100 nm, 110 nm, and 120 nm, respectively (Table 4). The order of allocation will follow the rules of 1D quasi-random binary data. For example, 1D Rudin-Shapiro binary data goes as:
1110110111100010 . . .
Separating the sequence by every 3 bits gives:
111/011/011/110/001/011 . . . .
These eight height scales (Table 4) are assigned to each unit nanostructure (i.e., pit). It makes the 2D patterns into a 3D nanostructure design, whose spatial distribution dominates the light-trapping properties.

TABLE 4

| Binary | Height (nm) | Binary | Height (nm) |
|---|---|---|---|
| 000 | 50 | 111 | 90 |
| 001 | 60 | 100 | 100 |
| 010 | 70 | 110 | 110 |
| 011 | 80 | 101 | 120 |

Figure 18:
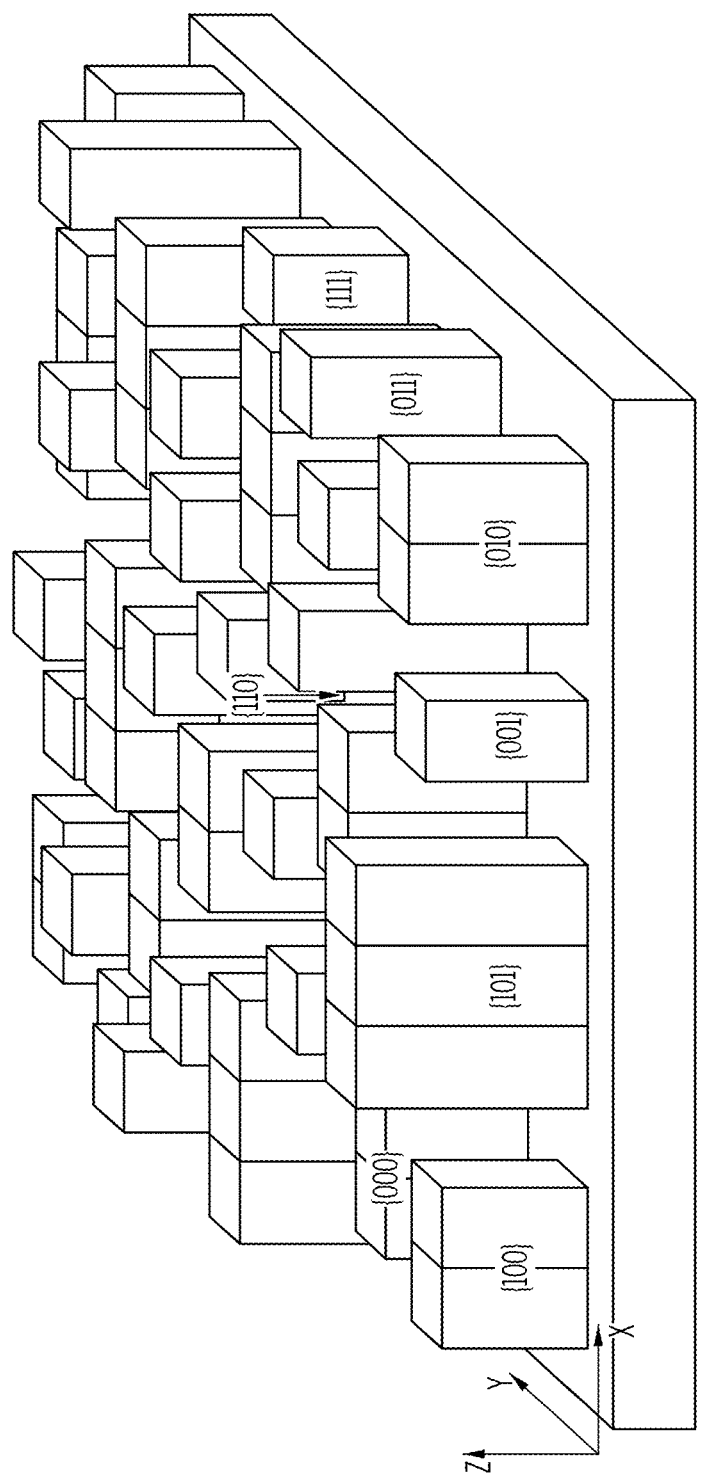
FIG. 18 is an illustration of a 3D quasi-random nanostructure design assigned by randomized heights, and 8 heights are quasi-randomly distributed.

As shown in FIG. 18, 3D QRPs are designed on the surface of the active layer of an a-Si:H thin-film solar cell to inherit the merits from 2D QRNs and the randomized heights that cause the higher spatial randomness. The FDTD simulations and CHARGE simulations are established to evaluate the 3D QRNs and verify concepts.

We first segmented the 2D binary matrix into unit square blocks at the x-y plane, and each block is painted into black if it is assigned "1" and white otherwise. For $\mu_x(J)$, it will be calculated the sum of the volume of the black blocks in subset J over the sum of the volume of the total black blocks in $I^3$. For $\mu(J)$, it will be calculated the total volume of subset J over the total volume of total blocks in $I^3$. Therefore, the discrepancy becomes:

$$D_N = \left| \frac{\text{Total volume of black boxes in } J}{\text{Total volume of total black boxes}} - \frac{A}{B} \right|$$

where A is the total volume of J, and B is the total volume of total blocks in $I^3$. For example, $I^3$ contains 31×78 unit-blocks in total and 581 black ones, while a subset J has 11 black blocks in a total of 5×7 blocks. Thus, the total volume of black blocks in J is the sum of the volume of these 11 black blocks. The height scales will be assigned to these black blocks (i.e., pits), and the height values of these 11 black blocks can be easily tracked from the sub-intervals. Therefore, the total volume of black blocks in J and the total volume of all black blocks in this pattern can be calculated. The total volume of J is considered as the whole area of J×the largest value of the height scales, and the total volume of total blocks in $I^3$ is considered as the whole area×the largest value of the height scales. Thus, the discrepancy of J in this pattern becomes $$D_N = \left| \frac{(\text{height}_1 + \text{height}_2 + ... + \text{height}_{11}) \times \text{unit area}}{(\text{height}_1 + \text{height}_2 + ... + \text{height}_{581}) \times \text{unit area}} - \frac{5 \times 7 \times 6}{31 \times 78 \times 6} \right| \approx$$

$$8.45 \times 10^{-2}.$$

Being more trackable than the varied values of discrepancies for all subsets J in $I^3$, the maximal deviation of all possible discrepancies, the star discrepancy ($D^*_N$), is employed as a criterion to evaluate the level of randomness of the spatial distribution.

Figure 19:
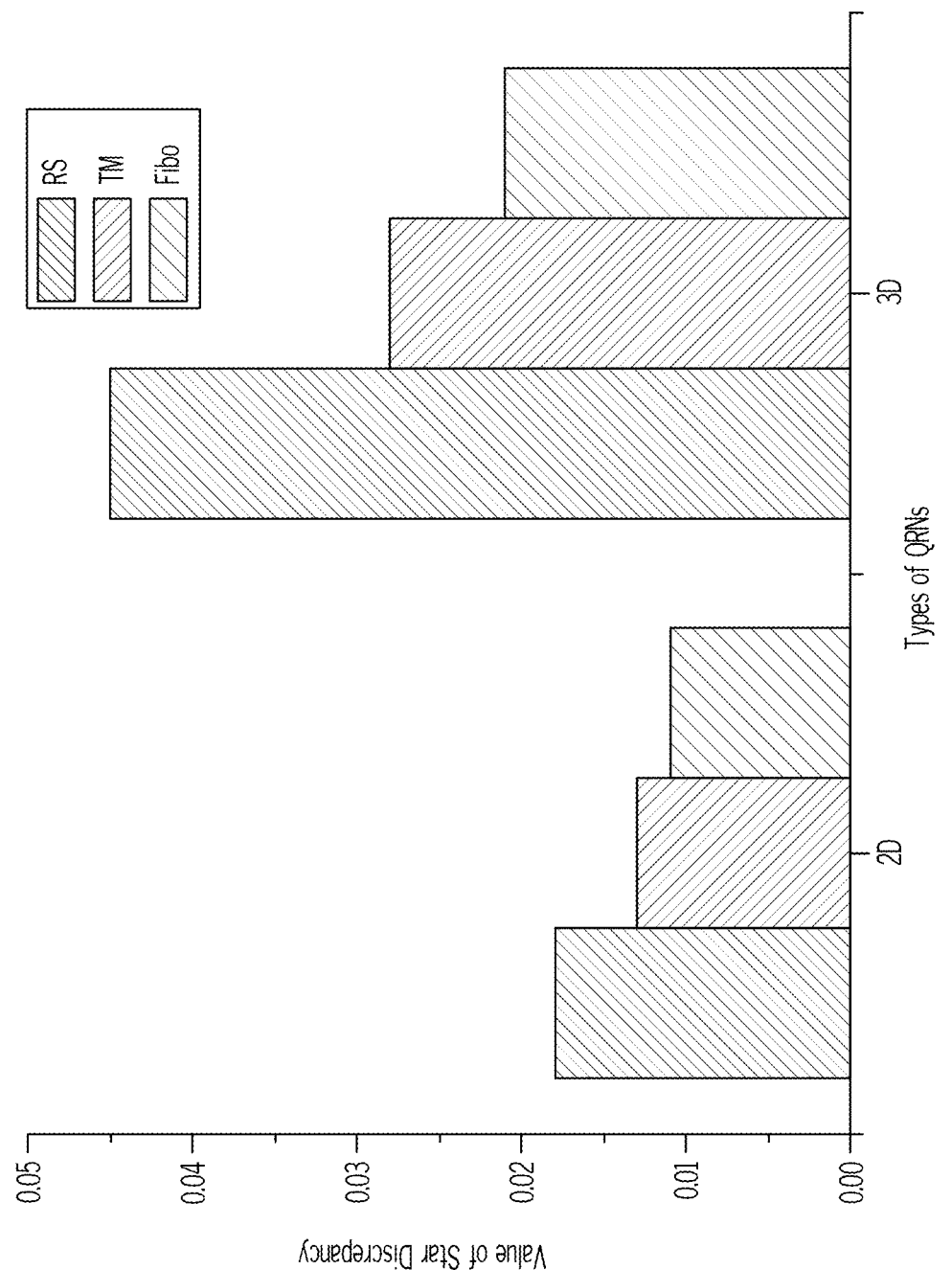
FIG. 19 shows plots illustrating the comparison of 2D and 3D quasi-random nanostructures based on their star discrepancy.
Figure 20:
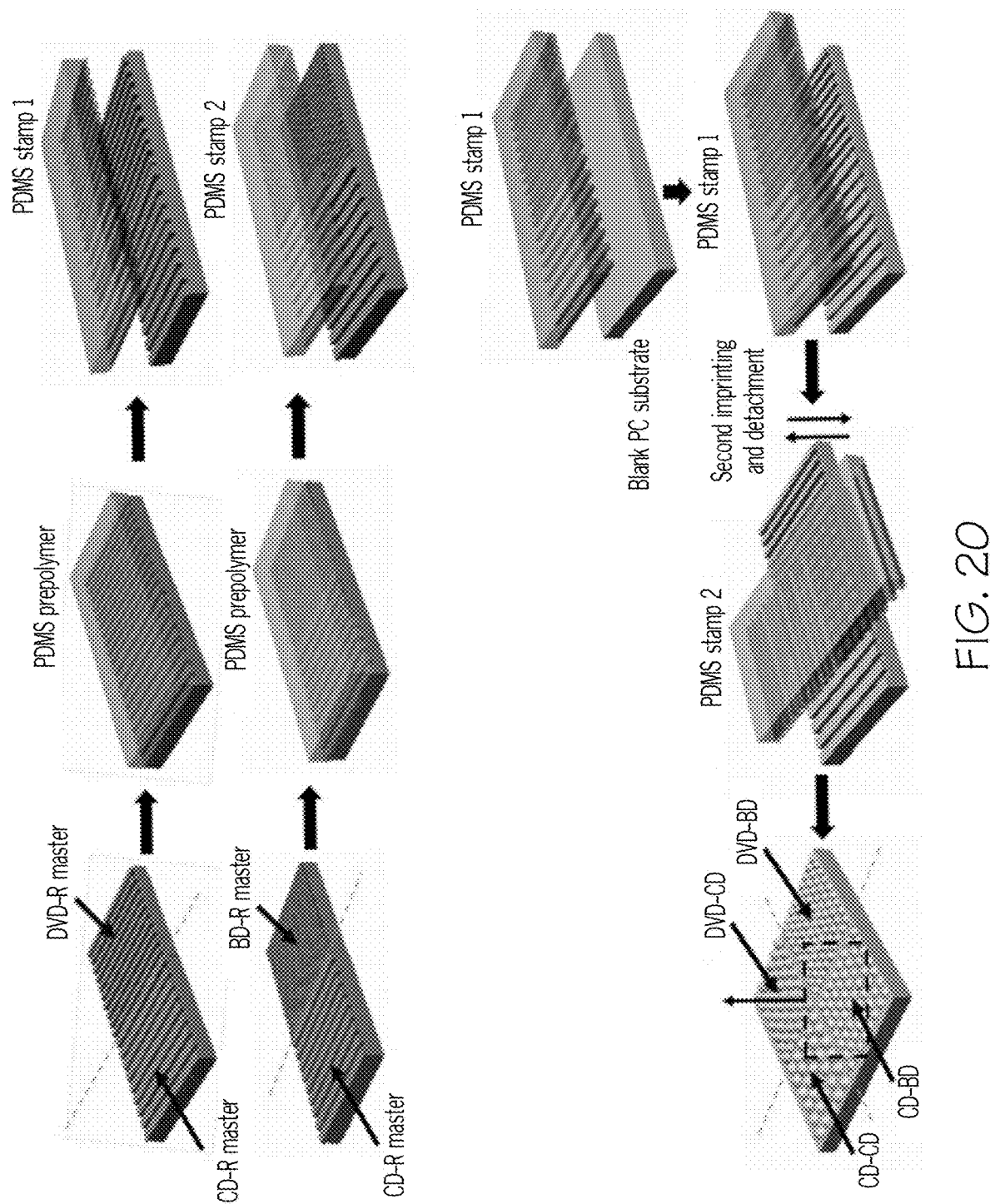
FIG. 20 shows an example of a process of preparing different kinds of two dimensional structures on a layer of a device.
Figure 21:
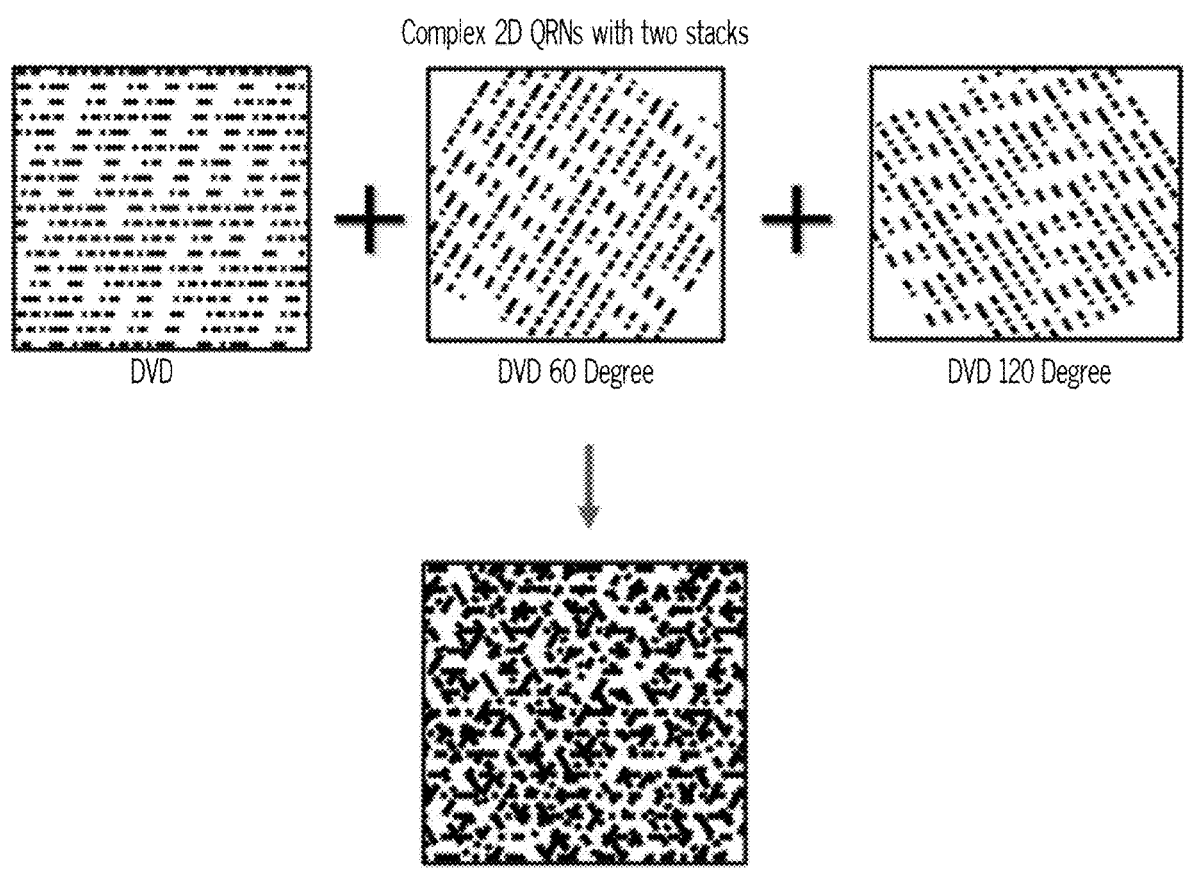
FIG. 21 shows a schematic illustration for a stacking method in which multiple nanostructures can be assembled to create a 3D nanostructured layer.

For ease of calculation, 30 pits are chosen inside each pattern to calculate the star discrepancy for each type of QRNs (i.e., RS, TM, Fibo). As shown in FIG. 19, the degrees of surface randomness for each type of QRNs follow the order: RS>TM>Fibo, while the degrees of spatial randomness exhibit the same tendency, implying that the higher dimensional QRN design can further increase the degrees of the randomness at the interface. When the height of each pit is randomized, the $D^*_N$ of the Fibo and TM are even higher than the best 2D QRP (i.e., RS). Although both surface morphology and randomized heights play an important role in light-trapping properties, calculating and optimizing the $D^*_N$ of the QRNs show a way to efficiently design and evaluate the QRNs without being hindered by control variate technique.

To understand the lower reflection over a broad visible wavelength, the reflection spectra of the 3D, 2D QRNs and the slab cell were studied. In the broad spectrum from 300 nm to 1200 nm, less reflection of the 3D QRNs is observed compared to those of the 2D QRNs, and slab cell. However, in the relative narrow bandwidth from 700 nm to 900 nm, the reflectance of the 3D QRNs almost has the same amplitude. This demonstrates that the 3D QRNs assist the solar cell better in a shorter wavelength range. The reduction of the reflectance is slowly converged when the reflectance of the whole device reaches up to 10%, which results in the absorption enhancement factor: $4n^2$, where n is the refractive index of the absorbing material.

Subsequently, the absorption is calculated and evaluated by the electric field distribution of one unit raw. The QRNs were designed along a plurality of tracks. Therefore, from one particular side (i.e., the y-z plane), the cross-sectional figure of the nanostructured semiconductor is the same as the nanostructured grating. The plane EM is propagated from the topside (Y=3 µm) to the surface of the nanostructured coating (Y=0 µm). A higher magnitude of $|E|^2$ at the interface between nanostructures and air could be seen by different color indexes, which indicates that our quasi-random nanostructures have stronger electric field intensity inside solar semiconductors. The quasi-random nanostructures could easily couple the plane EM wave and increase the light-trapping property. A higher electric field intensity is observed inside nanostructures indicating that the 3D QRNs outperform the 2D QRNs in some aspects. The electric field intensity drops when reaching to the bottom of the semiconductor layer, implying that most of the light has been absorbed by the semiconductor. However, for the 2D QRNs, there is a strong electric field intensity at the bottom, where the light will be transmitted and finally go through the semiconductor.

The CHARGE solver (Lumerical company) is used to model the real solar cell working situation. Compared to the ideal Si material in FDTD, the CHARGE solver takes non-ideal effects such as bulk and surface recombination into consideration. Based on the simulations and calculations, the short circuit density ($J_{sc}$) is 22% lower than the one generated in FDTD. The reason is that the carriers now have the chance to recombine before they are collected at the contact, and the distance they are traveling depends on where they are generated. The 3D QRNs outperform the 2D QRNs with the highest improvement of around 15%, and around 19.2% compared to slab cell. This result also matches with the star discrepancy calculation and Fourier Transform Analysis (FTA) results.

All the experiments above were conducted under perpendicular incident light. In fact, sunlight dynamically irradiates the land from the east to the west during the daytime. Therefore, we have investigated the wavelength-related reflectance of the Si-based solar cell with the 2D/3D QRNs under the angular incidence. The incident angle is defined as the angle between the incident light and the horizontal plane of the devices. Particularly, the light incident angle was changed from 0° to 75° with a 15° step, and the reflectance was weighted for ease of assessment. The 2D/3D QRNs have a slightly better broadband reflection reduction compared to the normal incidence for small incident angles, while the reductions are largely increased for large incident angles. The largest reduction is observed at 75 degrees, which gives ~35% reduction on weighted reflectance. The omnidirectional improvement of light absorption and energy conversion efficiency is of the significance for practical deployment of solar panels without a costly solar tracking system.

Features and advantages of this disclosure are apparent from the detailed specification, and the claims cover all such features and advantages. Numerous variations will occur to those skilled in the art, and any variations equivalent to those described in this disclosure fall within the scope of this disclosure. Those skilled in the art will appreciate that the conception upon which this disclosure is based may be used as a basis for designing other compositions and methods for carrying out the several purposes of this disclosure. As a result, the claims should not be considered as limited by the description or examples.

What is claimed is:

1. A method of nanostructuring a layer of a device, comprising:
   a) writing a pattern of nanostructures onto an optical medium, the pattern of nanostructures having a plurality of tracks aligned along their longitudinal axes, each of the plurality of tracks having a plurality of nanostructures, wherein the pattern of nanostructures is derived from a binary sequence;
   b) imprinting at least a portion of the pattern of nanostructures or a negative replica thereof on a surface of the device to form a nanostructured layer on the surface of the device; and
   c) imprinting at least one additional overlying pattern of nanostructures on the nanostructured layer of the device, wherein the at least one additional overlying pattern of nanostructures has a plurality of tracks aligned along their longitudinal axes, each of the plurality of tracks having a plurality of nanostructures, and wherein the overlying pattern of nanostructures is derived from a binary sequence.

2. The method of claim 1, wherein the optical medium comprises a laser-machinable material.

3. The method of claim 1, wherein the optical medium comprises polycarbonate.

4. The method of claim 1, wherein the optical medium is a recording layer of a CD, DVD, or Blue-Ray disc.

5. The method of claim 1, wherein the plurality of is a combination of at least two of pits, lands, pyramids, tubes, and pillars.

6. The method of claim 1, wherein the plurality of nanostructures is a plurality of pits and lands.

7. The method of claim 1, wherein the binary sequence is one-dimensional or two-dimensional.

8. The method of claim 1, wherein the binary sequence is quasi-random.

9. The method of claim 1, wherein the binary sequence is a periodic sequence, a random sequence, a quasi-periodic sequence, a Fibonacci sequence, a Thue-Morse sequence, a Rudin-Shapiro sequence, or a Halton sequence.

10. The method of claim 1, wherein the quasi-random pattern of nanostructures has a surface randomness derived from at least one star discrepancy calculation.

11. The method of claim 1, wherein imprinting comprises preparing a negative replica mold of the quasi-random pattern of nanostructures and stamping the surface of the device with the negative replica mold.

12. The method of claim 1, wherein imprinting comprises stamping the surface of the device with the optical medium having the quasi-random pattern of nanostructures written thereon.

13. The method of claim 12, wherein stamping comprises one or more hot-embossing steps.

14. The method of claim 1, wherein an angle $\theta$ defined by the longitudinal axes of the tracks of the at least one additional overlying pattern of nanostructures relative to the longitudinal axes of the tracks of the first pattern of nanostructures is different and within the range of $0°<\theta<360°$.

15. The method of claim 1, wherein the surface of the device comprises polydimethylsiloxane (PDMS).

16. The method of claim 1, further comprising doping the nanostructured layer with titanium oxide.

17. A device having at least one nanostructured layer prepared by the method of claim 1.

18. A method of nanostructuring a layer of a device, comprising:
   a) writing a pattern of nanostructures onto an optical medium, the pattern of nanostructures having a plurality of tracks aligned along their longitudinal axes, each of the plurality of tracks having a plurality of nanostructures, wherein the pattern of nanostructures is derived from a binary sequence;
   b) imprinting at least a portion of the pattern of nanostructures or a negative replica thereof on a surface of the device to form a nanostructured layer on the surface of the device; and
   c) doping the nanostructured layer on the surface of the device with titanium oxide.

19. The method of claim 18, wherein the optical medium comprises a laser-machinable material.

20. The method of claim 18, wherein the optical medium comprises polycarbonate.

* * * * *